US012099816B2

(12) United States Patent
Jalaluddin et al.

(10) Patent No.: US 12,099,816 B2
(45) Date of Patent: Sep. 24, 2024

(54) MULTI-FACTOR MODELLING FOR NATURAL LANGUAGE PROCESSING

(71) Applicant: Oracle International Corporation, Redwood Shores, CA (US)

(72) Inventors: Elias Luqman Jalaluddin, Seattle, WA (US); Vishal Vishnoi, Redwood City, CA (US); Mark Edward Johnson, Castle Cove (AU); Thanh Long Duong, Seabrook (AU); Ying Xu, Albion (AU)

(73) Assignee: Oracle International Corporation, Redwood Shores, CA (US)

( * ) Notice: Subject to any disclaimer, the term of this patent is extended or adjusted under 35 U.S.C. 154(b) by 369 days.

(21) Appl. No.: 17/578,170

(22) Filed: Jan. 18, 2022

(65) Prior Publication Data

US 2022/0230000 A1    Jul. 21, 2022

Related U.S. Application Data

(60) Provisional application No. 63/139,693, filed on Jan. 20, 2021.

(51) Int. Cl.
*G06F 40/56* (2020.01)
*G06F 40/295* (2020.01)
(Continued)

(52) U.S. Cl.
CPC ............ *G06F 40/56* (2020.01); *G06F 40/295* (2020.01); *G06F 40/35* (2020.01); *H04L 51/02* (2013.01)

(58) Field of Classification Search
None
See application file for complete search history.

(56) References Cited

U.S. PATENT DOCUMENTS 7,822,699 B2 * 10/2010 Katariya ............. G06F 16/3334
706/45
10,170,107 B1 * 1/2019 Dreyer .................... G06F 40/30
(Continued)

FOREIGN PATENT DOCUMENTS

CN    112164391    1/2021
WO    2020163627   8/2020

OTHER PUBLICATIONS

International Application No. PCT/US2022/012936, International Search Report and Written Opinion mailed on May 4, 2022, 10 pages.
(Continued)

*Primary Examiner* — Jonathan C Kim
(74) *Attorney, Agent, or Firm* — Kilpatrick Townsend & Stockton LLP

(57) ABSTRACT

Techniques are disclosed for systems including techniques for multi-factor modelling for training and utilizing chatbot systems for natural language processing. In an embodiment, a method includes receiving a set of utterance data corresponding to a natural language-based query, determining one or more intents for the chatbot corresponds to a possible context for the natural language-based query and associated with a skill for the chatbot, generating one or more intent classification datasets, each intent classification dataset associated with a probability that the natural language query corresponds to an intent of the one or more intents, generating one or more transformed datasets each corresponding to a skill of one or more skills, determining a first skill of the one or more skills based on the one or more transformed datasets and processing, based on the determined first skill, the set of utterance data to resolve the natural language-based query.

20 Claims, 13 Drawing Sheets

(51) Int. Cl.
  *G06F 40/35* (2020.01)
  *H04L 51/02* (2022.01)

(56) References Cited

U.S. PATENT DOCUMENTS

| | | | | |
|---|---|---|---|---|
| 11,295,735 | B1* | 4/2022 | Anuar | G10L 15/30 |
| 11,355,098 | B1* | 6/2022 | Zhong | G10L 15/22 |
| 11,699,444 | B1* | 7/2023 | Puri | G06F 40/30 |
| | | | | 704/275 |
| 11,922,123 | B2* | 3/2024 | Vishnoi | G06F 16/35 |
| 11,928,430 | B2* | 3/2024 | Pan | G06F 40/30 |
| 2012/0053945 | A1* | 3/2012 | Gupta | G10L 15/22 |
| | | | | 704/256 |
| 2014/0040748 | A1* | 2/2014 | Lemay | G06F 16/9562 |
| | | | | 715/728 |
| 2018/0329998 | A1* | 11/2018 | Thomson | H04N 21/42203 |
| 2018/0330721 | A1* | 11/2018 | Thomson | G10L 15/1822 |
| 2019/0102078 | A1* | 4/2019 | Bhatt | G06F 3/0481 |
| 2019/0124020 | A1* | 4/2019 | Bobbarjung | H04L 51/02 |
| 2019/0213490 | A1* | 7/2019 | White | G06N 5/043 |
| 2019/0318238 | A1* | 10/2019 | Nokbak Nyembe | G06N 5/043 |
| 2020/0005776 | A1* | 1/2020 | Curtis | G10L 15/063 |
| 2020/0184956 | A1* | 6/2020 | Agarwal | G10L 15/22 |
| 2020/0257856 | A1* | 8/2020 | Peper | G06N 20/00 |
| 2020/0342032 | A1 | 10/2020 | Subramaniam et al. | |
| 2021/0065017 | A1* | 3/2021 | Ramnani | G06N 5/025 |
| 2021/0312906 | A1* | 10/2021 | Kuo | G10L 15/1822 |
| 2021/0350084 | A1* | 11/2021 | Zhang | G06F 40/30 |
| 2021/0374603 | A1* | 12/2021 | Xia | G06N 3/045 |
| 2022/0230000 | A1* | 7/2022 | Jalaluddin | G06F 40/295 |
| 2022/0366908 | A1* | 11/2022 | Takahashi | G10L 15/22 |
| 2022/0399023 | A1* | 12/2022 | Gyanchandani | G10L 15/28 |
| 2023/0112843 | A1* | 4/2023 | Coutinho | G06F 40/279 |
| | | | | 707/723 |
| 2024/0054156 | A1* | 2/2024 | Vincent | G10L 15/22 |

OTHER PUBLICATIONS

Ruder; Sebastian; "An Overview of Multi-Task Learning in Deep Neural Networks", *Sebastian Ruder*, May 29, 2017, 32 pages, retrieved from: https://ruder.io/multi-task/, arXiv preprint arXiv:1706. 05098.

Sugitomo, et al., Fundamental Factor Models Using Machine Learning, *Journal of Mathematical Finance*, vol. 8, 111-118, Feb. 12, 2018, https://doi.org/10.4236/jmf.2018.81009.

* cited by examiner

MULTI-FACTOR MODELLING FOR NATURAL LANGUAGE PROCESSING

CROSS REFERENCE TO RELATED APPLICATIONS

This application is a non-provisional application of and claims the benefit of and priority to U.S. Provisional Patent Application No. 63/139,693, filed Jan. 20, 2021, which is incorporated by reference herein in its entirety for all purposes.

FIELD OF THE INVENTION

The present disclosure relates generally to chatbot systems, and more particularly, to techniques for multi-factor model training for chatbot systems in natural language processing.

BACKGROUND

Instant messaging functionality and automated chat platforms are efficient solutions to modern customer service issues. Organizations can leverage these practices to provide timely and responsive service to their customers without committing valuable human capital to individual user inquiries. Modern automated chat platforms may utilize a parent "chatbot" to handle customer service requests. The parent chatbot may coordinate with multiple child chatbots which are delegated more specialized tasks. However, choosing the correct chatbot to which a task should be delegated is a difficult and potentially costly decision. Certain chatbots is designed to handle only a specific range of inquiries, and certain chatbots may handle a specialized task far less efficiently than another chatbot. Failing to select the most efficient chatbot to answer a customer inquiry can result in decreased performance, inefficient resource utilization, and a frustrated customer base.

For example, some chatbots may include a number of "skill" classes that will assist the chatbot in processing and responding to queries. These queries may take the form of an "utterance" in a natural language-based format that simulates textual conversation or requests. The utterance is processed to determine a most-likely skill that a chatbot should employ to resolve the utterance and respond to a query. For example, an "order pizza" skill class is selected for a chatbot to respond to a natural language query of "please order me a pizza."

Small differences in the context, cadence, spelling, tone, and/or setting of the customer inquiry can cause selection of the wrong chatbot/skill for a specific task. When an organization performs hundreds or thousands of automated inquiry responses each day, the errors in selecting chatbot can compound quickly. Simple methods of selecting chatbots such as one-to-one mapping of words to specific chatbots may fail to account for appropriate contextual analysis and do not account for the complexities of a conversation.

To assist in selecting a skill, chatbots may employ machine learning models to process utterances and output a most-likely skill for response to the utterance. Selection of a skill to assist in answering an inquiry can be based on a contextual and lexicographical analysis of the inquiry provided to the organization. Accordingly, a chatbot is trained using single-factor selection machine learning techniques to select a skill given an input utterance. A single-factor model directly maps the input to a desired output, for example a received utterance to a predicted skill for processing the utterance. While single-factor machine learning techniques is more time-efficient in predicting skills from input utterances, such single-factor models fail to take into account important contexts, cadences, spellings, tones, or intents of a utterance. For example, the utterance "I ordered a pizza and it didn't arrive" is intended for a customer service chatbot skill, but may instead be directed to a pizza ordering chatbot skill based on the partial phrase "ordered a pizza." As a result, training machine learning models using less contextually dependent methods, such as direct skill selection, does not provide an appropriate level of contextual learning required by an efficient chatbot model. Thus, standard machine learning techniques for directly determining an appropriate skill class for resolving an utterance are often insufficient.

BRIEF SUMMARY

Techniques are disclosed for multi-factor modelling for training and utilizing chatbot systems for natural language processing.

In one embodiment, a computer-implemented method includes receiving, by a computing device, a set of utterance data corresponding to a natural language-based query that is interpretable by a chatbot; determining, by the computing device, one or more intents for the chatbot, wherein each of the one or more intents corresponds to a possible context for the natural language-based query and is associated with a skill of one or more skills for the chatbot; generating, by the computer device using an intent classifier model, one or more intent classification datasets based on the one or more intents, wherein each intent classification dataset is associated with a probability that the natural language query corresponds to an intent of the one or more intents; generating, by the computing device using a transform mask model, one or more transformed datasets based on the one or more intent classification datasets, wherein each of the one or more transformed datasets corresponding to a skill of the one or more skills; determining, by the computing device, a first skill of the one or more skills based on the one or more transformed datasets; and processing, based on the determined first skill, the set of utterance data to resolve the natural language-based query.

In one embodiment, the set of utterance data is received from a client device interacting with an automated digital assistant in communication with the computer device.

In one embodiment, the transformation mask model comprises one or more transformation values, each transformation value corresponding to a ratio of least one intent and at least one skill. In a further embodiment, the set of utterance data comprises at least an indication of a ground-truth skill of the one or more skills and the method further comprises comparing, by the computing device, the ground-truth skill with the first skill to generate one or more training loss values; and altering, by the computing device, the one or more transformation values based on the training loss values.

In one embodiment, the intent classifier model is a machine learning model configured to receive, as input, the set of utterance data and output the one or more intent classification datasets, the set of utterance data comprises at least an indication of a ground-truth skill of the one or more skills, and the method further comprises comparing, by the computing device, the ground-truth skill with the first skill to generate one or more training loss values; and training, by the computing device, the machine learning model using the one or more training loss values to by altering the structure of the machine learning model based on the training loss values.

In one embodiment, the method further comprises generating, by the computing device using a skill classifier model, second skill data, wherein the skill classifier model is a machine learning model configured to receive, as input, the set of utterance data and output a predicted skill of the one or more skills; comparing, by the computing device, the first skill and the second skill to generate one or more training loss values, the one or more training loss values corresponding to one or more differences between the first skill and the second skill; and training, by the computing device, the machine learning model using the one or more training loss values to by altering the structure of the machine learning model based on the training loss values.

In one embodiment, the method further comprises processing, based on the determined first skill, the set of utterance data to generate a natural language-based response to the natural language-based query; and sending, to a client device, the natural language-based response.

In one embodiment, the method further comprises processing, by the computing device, the utterance data to generate refined utterance data in a format for input to the intent classifier model, the refined utterance data is input into the intent classifier model to cause generating the one or more intent classification datasets.

In one embodiment, each transformed dataset of the one or more transformed datasets comprises a probability value corresponding to a likelihood that the utterance data corresponds to a skill of the one or more skills, and determining the first skill comprises selecting a skill corresponding to a transformed dataset having a highest probability value from among a set of one or more probability values.

In one embodiment, the first skill comprises generating one or more average probability values for each skill based on the probability values associated with the intent classification datasets and selecting a skill associated with a highest average probability value from among the one or more average probability values.

Some embodiments of the present disclosure include a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein.

The techniques described above and below is implemented in a number of ways and in a number of contexts. Several example implementations and contexts are provided with reference to the following figures, as described below in more detail. However, the following implementations and contexts are but a few of many.

DETAILED DESCRIPTION

Figure 1:
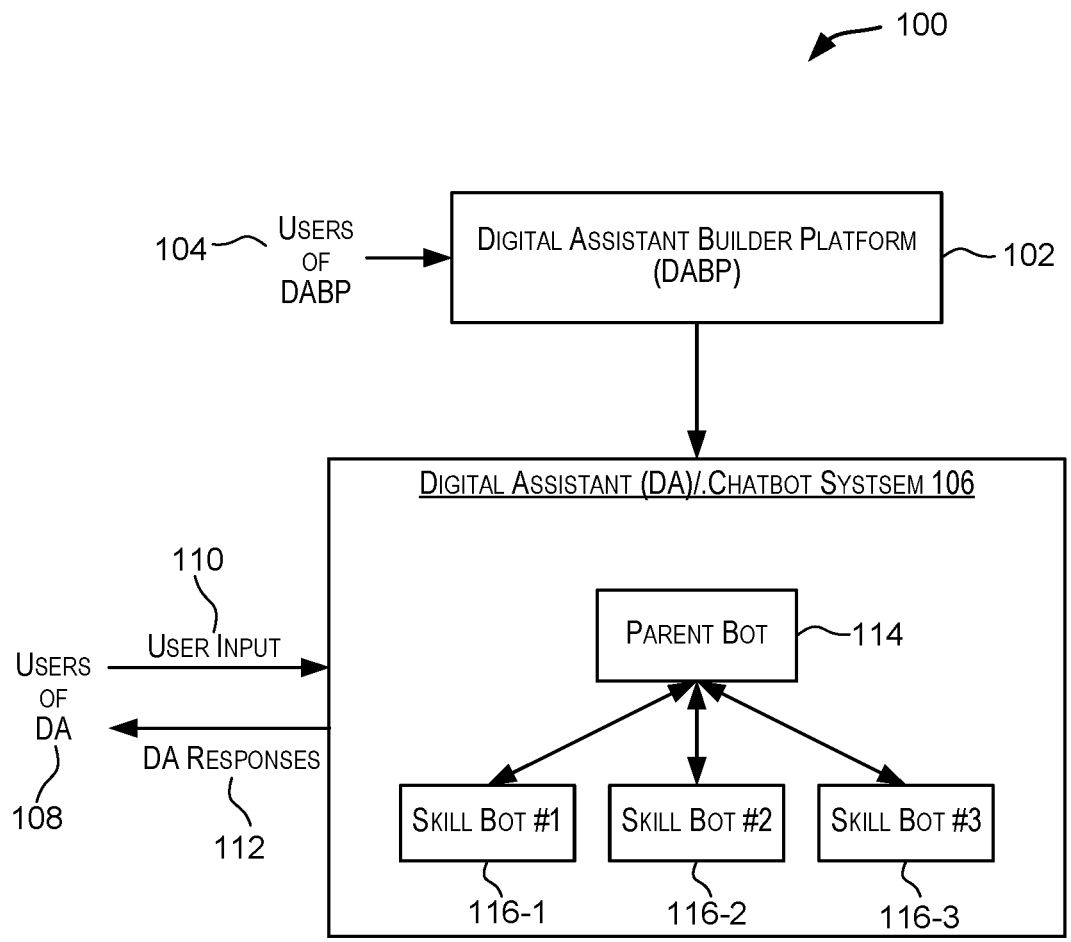
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments is practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Certain skills of a chatbot is designed to process and respond to only a specific range of utterances, and certain skills may only resolve a specialized task that another skill cannot resolve. For example, while some skills of a chatbot may relate to tasks that are somewhat similar (e.g., operating the automated systems of a pizzeria), each task is suited to processing and responding to specific types of utterances (e.g., starting a new pizza order, modifying an existing order, providing customer support, providing information relating to deals and hours of operation, etc). Failing to select the most efficient skill to answer a customer inquiry can result in decreased performance, inefficient resource utilization, and a frustrated customer base.

As described above, intrinsic elements of natural language, such as context, cadence, spelling, tone, and/or setting of the customer inquiry can cause selection of the wrong chatbot/skill for a specific task. To assist in selecting a most likely skill, chatbots may employ machine learning models to process utterances and output a most-likely skill for response to the utterance. Selection of a skill to assist in answering an inquiry can be based on a contextual and lexicographical analysis of the inquiry provided to the digital assistant. For example, the utterance is sent to a "skill classifier" for parsing, using machine learning techniques, the utterances to determine a particular skill for resolving an utterance. Single-factor modelling techniques for selecting skills map an input, such as a natural language utterance, directly to a predicted skill for resolving the utterance. Single-factor modelling is a useful technique because it may allow for prediction of a skill quickly, which is preferential when responding to customers utilizing an automated digital assistant. However, single-factor machine learning techniques for selecting skills based on processing of an utterance may fail to take into account important contexts, cadences, spellings, tones, or intents of an utterance. For example, the utterance "I ordered a pizza and it didn't arrive" is intended for a customer service chatbot, but may instead be directed to a pizza ordering chatbot based on the phrase "ordered a pizza."

Training a chatbot model to select a skill based on a direct mapping of the utterance to a possible skill may not adequately train the chatbot model to process contexts and cadences of the utterance effectively enough to select a skill by with sufficient accuracy. The insufficiency of single-factor skill-based selection is apparent both in the training and prediction phases of chatbot systems. For example, training for a machine learning model of a chatbot system to select and determine a skill directly from an input utterance in order to respond to an utterance is lacking in sufficient contextual detail to build a proper classification model. A poorly trained chatbot utilizing single-factor modelling may then proceed to select inappropriate skills for resolving utterances when interacting with real clients/customers.

Described herein are techniques for multi-factor modelling for natural language processing to train and deploy chatbots/skills to process and respond to natural language-based queries. Multi-factor modelling techniques allow for improved training and processing of input data, such as utterance data, to better predict skills for processing an utterance and training a skill classifier model for doing the same. The multi-factor models may also be trained to provide more accurate output data for training single-factor models, such as a skill classifier, or processing contextually complex utterances for responding to a customer/client inquiry.

A multi-factoring modelling technique as described herein utilizes a structural class hierarchy of a chatbot system, including a set of skills for each chatbot, and a set of intents for each skill. Skills and intents are described below, including with reference to FIGS. 1-3. A multi-factor machine learning model is employed to process a natural language query to output intermediate contextual datasets representing to intent classifications for the utterance. The intermediate intent classifications may then be utilized to determine a skill for processing an utterance or to further improve training of skill classifications of a chatbot system. Thus, multi-factor modelling techniques allow for the introduction of contextually determined intent data to be factored into the final selection of a chatbot skill for processing an utterance. Various transformations may also be applied to intermediate intent classifications prior to the selection of the final skill for processing an utterance. For example, a transformational "mask" is applied to the intermediate intent classification data to map the intent classifications to a corresponding skill classification. A skill classification generated by multi-factor modelling techniques will thus include more contextually relevant processing of the original utterances compared to single-factor modelling techniques, such as direct skill prediction from the utterance.

The techniques described herein further improve the training and optimization of single-factor models that can be deployed for interactions with customers. As described above, single-factor models alone are insufficient for processing low-granularity contextual speech and cadences in natural language. Attempting to refine these single-factor models with basic supervised machine learning techniques may somewhat increase the accuracy of the single-factor model in predicting a skill, but does not allow for context-based training. The use of multi-factor models for selecting a more contextually-accurate skill from a set of utterance data and the comparison of that contextually predicted skill with a predicted skill from a single-factor model will yield context-based loss data that is used to retrain the single-factor model in a way single supervised learning cannot. Thus, multi-factor modelling will not only produce more accurate predictions when processing natural language queries, it will also train time-efficient single-factor models to better predict skills given a set of input utterance data.

As described herein, "utterance data" may include data relating to a natural language-based query provided by a customer or client for resolution by an automated chatbot system. For example, an utterance may include the natural language-based query is "I would like to order a pizza."

As described herein, a "contextual class" is a chatbot "skill" relating to a responsive category and/or subroutine for resolving, by the chatbot, an utterance. A contextual skill class may include instructions, configurations, or other functionalities for processing and responding to an utterance in a natural language-based format. For example, a chatbot may include a skill, such as "Pizza Ordering Skill." Each chatbot may include more than one "skill" for resolving and responding to utterances.

As described herein, a "contextual sub-class" is a chatbot "intent" relating to a responsive sub-category and/or sub-routine for resolving, by the chatbot and through a particular skill, an utterance. A contextual intent class may include instructions, configurations, or other functionalities for processing and responding to an utterance in a natural language-based format according to a skill to which the intent belongs. For example, a chatbot may include a skill such as "Pizza Ordering Skill," and the skill may further include an intent such as "Place new order from customer." Each skill may include/correspond to more than one "intent" for resolving and responding to utterances, and each intent may correspond to a different subtask/context.

As described herein, a "transform model" is a set of transformation data representing a correspondence between one or more intents and one or more skills of a chatbot model. For example, a transform model is a dynamically trained set of mapping data for corresponding a "contextual dataset" of intent score values output by a machine learning model to a "transformed" dataset of skill scores for selecting a skill to respond to a natural language-based query. The mapping data may take the form of a matrix, where the rows and columns of the matrix correspond to skills and intents, respectively and vice-versa.

Example Chatbot System

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which is referred to as a channel, is an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system is associated with a Uniform Resource Identifier (URI). The URI may identify the bot system using a string of characters. The URI is used as a webhook for one or more messaging application systems. The URI may include, for example, a Uniform Resource Locator (URL) or a Uniform Resource Name (URN). The bot system is designed to receive a message (e.g., a hypertext transfer protocol (HTTP) post call message) from a messaging application system. The HTTP post call message is directed to the URI from the messaging application system. In some embodiments, the message is different from a HTTP post call message. For example, the bot system may receive a message from a Short Message Service (SMS). While discussion herein may refer to communications that the bot system receives as a message, it should be understood that the message is an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a parent bot based on detecting an invocation name in an utterance. In response to detection of the invocation name, the utterance is refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state is used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the chatbot to enable the intent classifier to subsequently determine whether an input utterance from a user matches the order pizza intent. A bot intent is associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances is in English, or some other language. When an utterance is in speech form, the speech input is converted to text form utterances in that particular language and the text utterances are then processed by digital assistant 106. Various speech-to-text processing techniques is used to convert a speech or audio input to a text utterance, which is then processed by digital assistant 106. In some embodiments, the speech-to-text conversion is done by digital assistant 106 itself.

An utterance, which is a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence is identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems is implemented as pluggable units that can be called using service calls from an NLU core server. This makes the NLU processing flexible and extensible for each language, including allowing different orders of processing. A language pack is provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses is in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures is used to implement a digital assistant or chatbot system. For example, in certain embodiments, the digital assistants created and deployed using DABP 102 is implemented using a parent bot/child (or sub) bot paradigm or architecture. According to this paradigm, a digital assistant is implemented as a parent bot that interacts with one or more child bots that are skill bots. For example, in the embodiment depicted in FIG. 1, digital assistant 106 comprises a parent bot 114 and skill bots 116-1, 116-2, etc. that are child bots of parent bot 114. In certain embodiments, digital assistant 106 is itself considered to act as the parent bot.

A digital assistant implemented according to the parent-child bot architecture enables users of the digital assistant to interact with multiple skills through a unified user interface, namely via the parent bot. When a user engages with a digital assistant, the user input is received by the parent bot. The parent bot then performs processing to determine the meaning of the user input utterance. The parent bot then determines whether the task requested by the user in the utterance can be handled by the parent bot itself, else the parent bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the parent bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common parent bot interface and behind the scenes multiple skill bots are provided for handling the user request.

In certain embodiments, in a parent bot/child bots infrastructure, the parent bot is configured to be aware of the available list of skill bots. The parent bot may have access to metadata that identifies the various available skill bots, and for each skill bot, the capabilities of the skill bot including the tasks that can be performed by the skill bot. Upon receiving a user request in the form of an utterance, the parent bot is configured to, from the multiple available skill bots, identify or predict a specific skill bot that can best serve or handle the user request. The parent bot then routes the utterance (or a portion of the utterance) to that specific skill bot for further handling. Control thus flows from the parent bot to the skill bots. The parent bot can support multiple input and output channels.

While the embodiment in FIG. 1 shows digital assistant 106 comprising a parent bot 114 and skill bots 116-1, 116-2, and 116-3, this is not intended to be limiting. A digital assistant can include various other components (e.g., other systems and subsystems) that provide the functionalities of the digital assistant. These systems and subsystems is implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations is made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:
   (1) Configuring settings for a new skill bot
   (2) Configuring one or more intents for the skill bot
   (3) Configuring one or more entities for one or more intents
   (4) Training the skill bot (5) Creating a dialog flow for the skill bot (6) Adding custom components to the skill bot as needed (7) Testing and deploying the skill bot Each of the above steps is briefly described below.

(1) Configuring settings for a new skill bot—Various settings is configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances is specified as example utterances for an intent.

The intents and the their associated example utterances are used as training data to train the skill bot. Various different training techniques is used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context is needed to enable the skill bot to properly respond to a user utterance. For example, there is situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity is defined by the skill bot designer that enables various banking transactions by checking the user input for keywords like checking, savings, and credit cards, etc.

(4) Training the skill bot—A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance is a question that requires only a single answer and no further conversation. In order to handle such situations, a Q&A (question-and-answer) intent is defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML is used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:

(a) a context section
(b) a default transitions section
(c) a states section

Context section—The skill bot designer can define variables that are used in a conversation flow in the context section. Other variables that is named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios is handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the parent bot). At the parent bot or digital assistant level, built-in system intents is configured for the digital assistant. These built-in system intents are used to identify general tasks that the digital assistant itself (i.e., the parent bot) can handle without invoking a skill bot associated with the digital assistant. Examples of system intents defined for a parent bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the parent bot to select a particular skill bot for handling an utterance.

At the parent bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or parent bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the parent bot itself according to the selected system intent.

Figure 2:
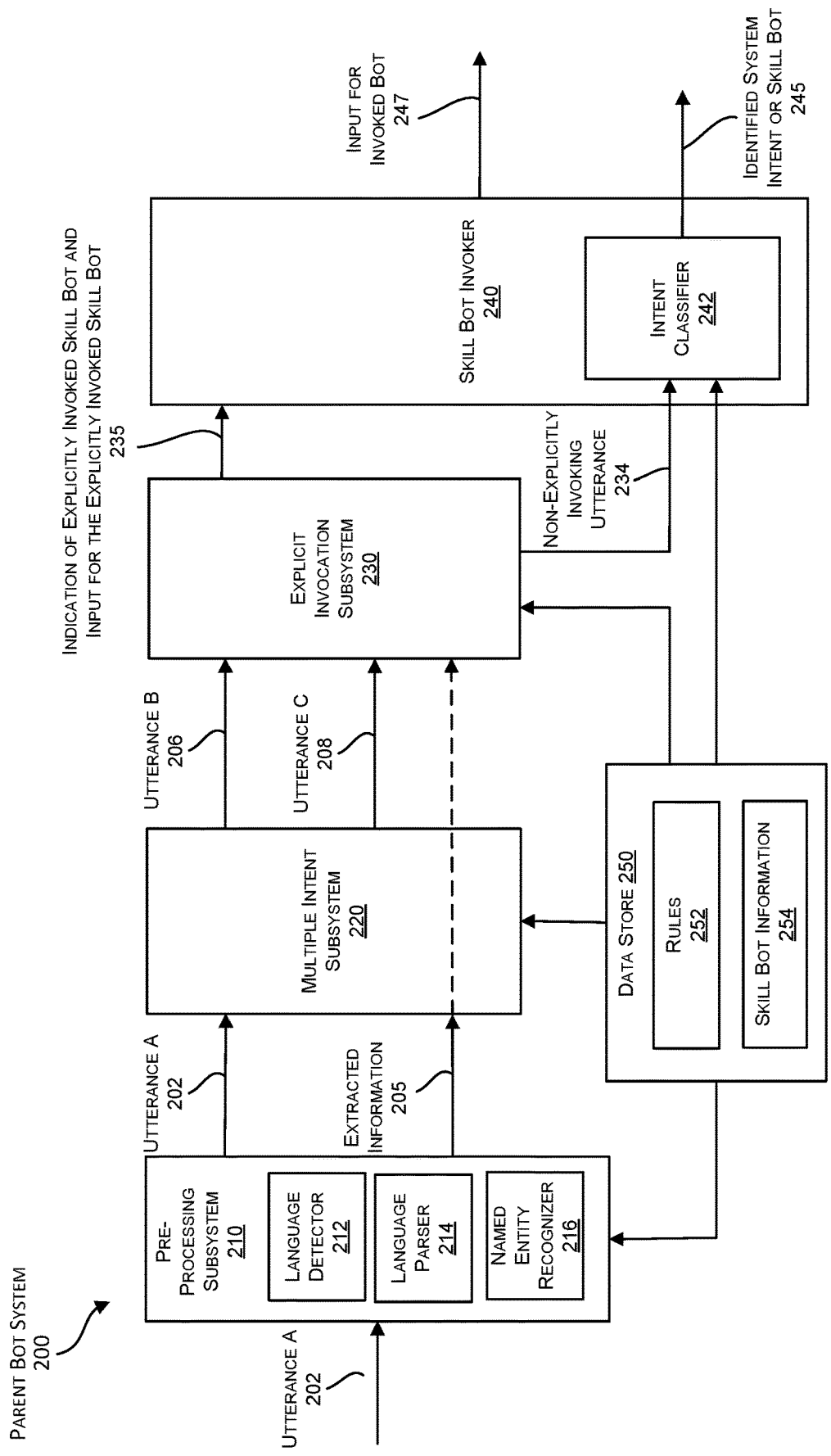
FIG. 2 is a simplified block diagram of a parent bot (MB) system according to certain embodiments.

FIG. 2 is a simplified block diagram of a parent bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a parent bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit card." Language parser 214 may also identify relationships between the words in the utterance 202. For example, in some embodiments, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
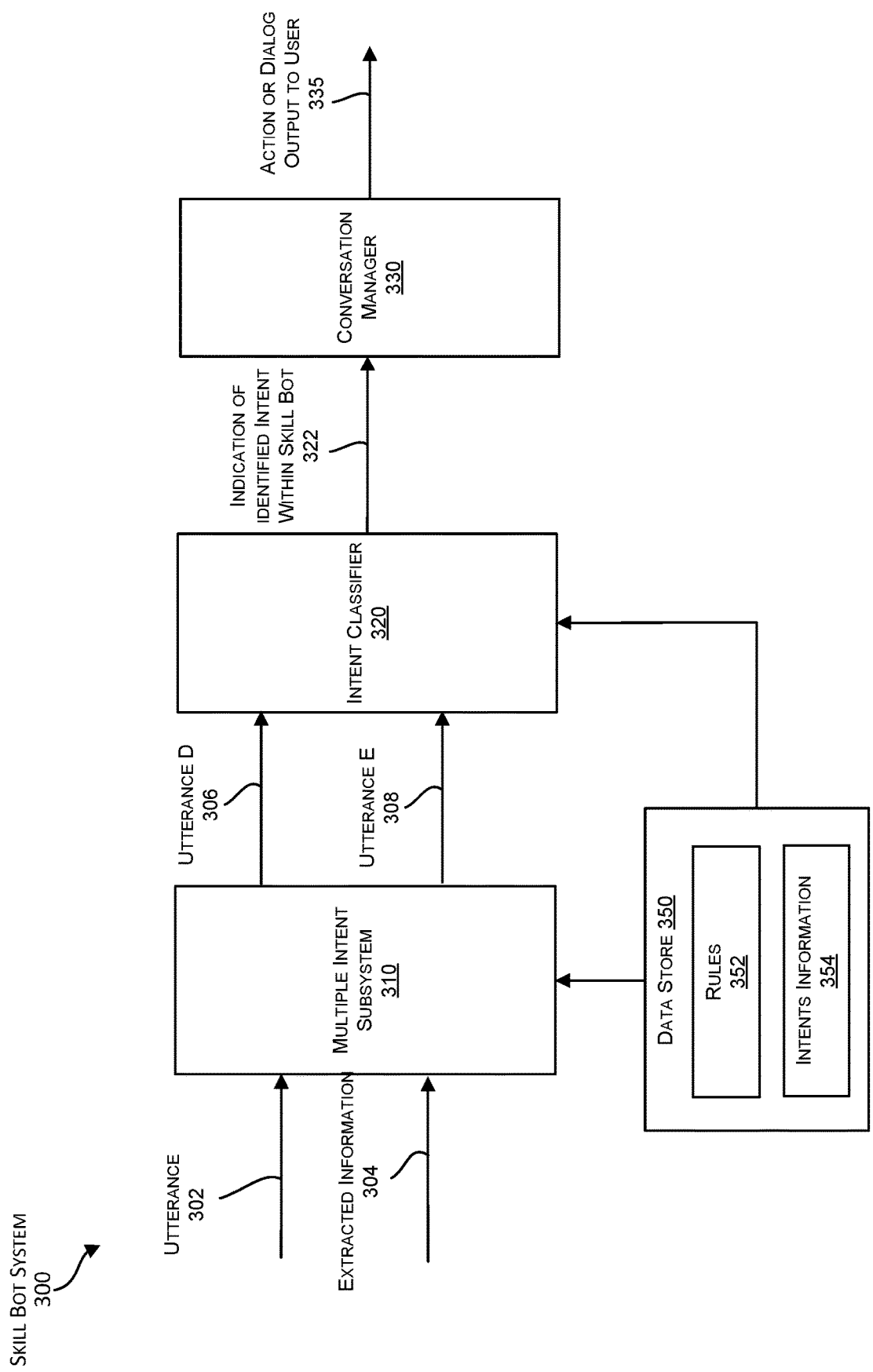
FIG. 3 is a simplified block diagram of a skill bot system according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the parent bot itself) that can handle the utterance 202. Therefore, the processing performed by MIS 220 does not require knowledge of what bots are in the chatbot system (e.g., the identities of skill bots registered with the parent bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the parent bot to determine which bot to use for handling the utterance. In some instances, the intent classifier 242 will determine that the parent bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the parent bot has to perform. For example, when there is an explicit invocation, the parent bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there is situations where there is an overlap in functionalities between multiple skill bots. This may happen, for example, if the intents handled by the two skill bots overlap or are very close to each other. In such a situation, it is difficult for the parent bot to identify which of the multiple skill bots to select based upon intent classification analysis alone. In such scenarios, the explicit invocation disambiguates the particular skill bot to be used In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the parent bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance is provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the parent bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the parent bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the parent bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular parent bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 4 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a parent bot. When the utterance 302 is supplied through a parent bot, e.g., as a result of processing through MIS 220 and EIS 230 in the embodiment depicted in FIG. 4, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the parent bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the parent bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 is implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a parent bot or digital assistant, e.g., the data store 250 in FIG. 2.

Example Data Processing System

Figure 4:
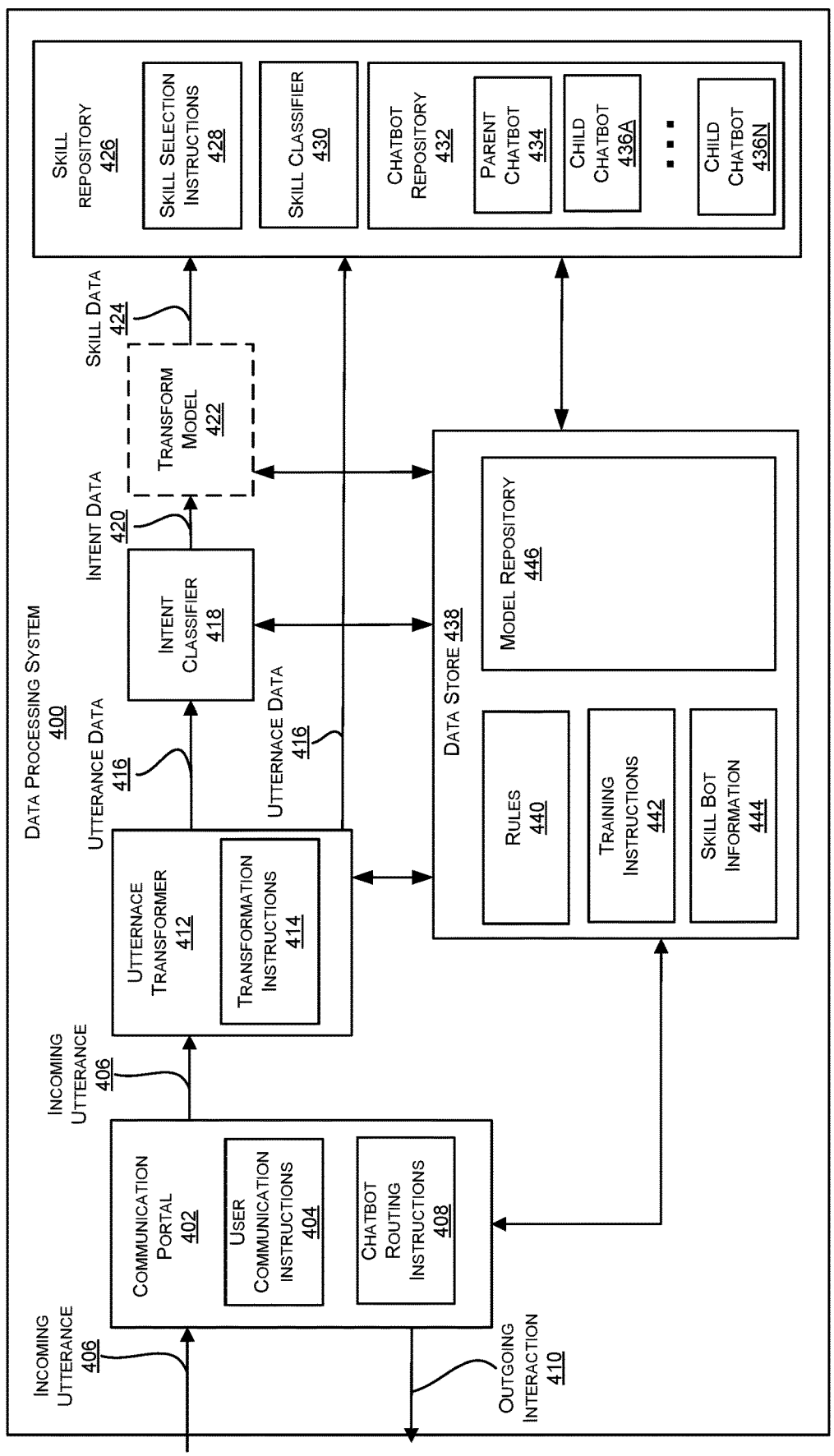
FIG. 4 is a simplified block diagram of a computing system implementing a utterance data processing system according to certain embodiments.

FIG. 4 is a simplified block diagram of a data processing system 400 according to certain embodiments. The arrangement shown in FIG. 4 is an example embodiment of a data processing system which is utilized to perform all or part of the methods described herein, though the system shown in FIG. 4 is not the only system that may perform those methods. Data processing system 400 can be implemented in software only, hardware only, or a combination of hardware and software. Data processing system 400 includes communication portal 402. Communication portal 402 be any hardware, software, or instructions which allow communication between an outside entity and data processing system 400. In various embodiments communication portal 402 allows for the exchange of messages between a user and a chatbot implemented by data processing system 400. For example, a user may send an incoming utterance 406 to the data processing system 400 as part of an interaction with a chatbot. The incoming utterance 406 is received and/or interpreted according to user communication instructions 404. User communication instructions 404 is any set of instructions or steps which allow the communication portal to intake an incoming utterance 406 or send an outgoing interaction 410. In various embodiments chatbot routing instructions is implemented to send an outgoing interaction 410 associated with a chatbot to a user.

Once the incoming utterance 406 has been received by communication portal it will be routed to utterance transformer 412. Utterance transformer 412 is any entity in data processing system 400 which may transform the incoming utterance 406 into utterance data 416. In various embodiments utterance transformer 412 comprises transformation instructions 414 which may contain instructions or steps for transforming the incoming utterance 406 into utterance data 416. Utterance transformer 412 will alter a received incoming utterance 406 in a natural language-based format into input data that is received and parsed by a classifier model, such as an intent classifier. For example, incoming utterance 406 is utterance data in the same format that it was received from a client/customer interacting with an automated digital assistant in order to resolve the utterance using a chatbot. The utterance transformer 412 utilizes transformation instructions 414 to generate corresponding utterance data 416 that is in a format that may be input to a classifier model. This may be performed when the format of the incoming utterance 406 is not acceptable as input for a classifier model. In various embodiments, utterance data 416 from utterance transformer 412 is sent to intent classifier 418. Intent classifier 418 may classify, quantify, or otherwise construct intent data 420 corresponding to the incoming utterance 406. In various embodiments, intent data 420 may correspond to one or more probabilities that a particular intent corresponds to the incoming utterance 406. Intent classifier is, for example, an artificial neural network employing nodes including nodal parameters or weights that is adjusted during a training sequence to better output the one or more probabilities for future utterance data 416 received. For example, a training dataset with some "ground-truth" data is received at intent classifier 418 and the probabilities generated therefrom is compared to a "desired" intent specified by the ground-truth data to generate a loss that will be used to retrain the machine learning model.

The intent data 420 is sent to transform model 422 from intent classifier 418. The transform model is an entity existing independently within data processing system 400 or is stored and implemented by a separate component, such as data store 438. Transform model 422 transforms the intent data 420 into skill data 424 which will be sent to skill repository 426. In various embodiments skill data 424 may correspond to one or more probabilities that a particular skill or child chatbot corresponds to the incoming utterance 406 based on the intent data 420 input thereto. In various embodiments, transform model 422 performs one or more mathematical transformations on intent data 420 to create skill data 424. Skill data 424 is sent to skill repository 426 once it has been transformed by transform model 422. Skill repository 426 is any entity in data processing system 400 which stores, implements, or otherwise manipulates skill data 424 to implement the methods described herein. Skill repository 426 comprises skill selection instructions 428. Skill selection instructions 426 is any set of instructions of steps which aid in the selection of a skill or chatbot in response to an incoming utterance 406. For example, skill selection instructions 428 may cause the selection of a chatbot and/or skill for interacting with a user in response to parsing skill data 424.

In various embodiments, utterance transformer 412 may send utterance data 416 directly to skill repository 426 without first passing the data through the intent classifier 418 and/or the transform model 422. In various further embodiments, skill classifier 430 may intake the utterance data 416 and create skill data according to instructions separate from those of intent classifier 418 and transform model 422. The comparison is used to retrain any of the intent classifier 418, the transform model 422, and/or the skill classifier 430. This represents the comparison of a predicted skill based on a single-factor modelling technique and a predicted skill based on a multi-factor modelling techniques. The input of the utterance data 416 to the intent classifier 418 and then the transform model 422 represents a multi-factor modelling approach for predicting a skill to process the utterance. In contrast, direct input of the utterance data 416 to the skill classifier 430 represents a single-factor modelling approach for predicting a skill to process the utterance. The difference between the predicted skills using both approaches may be compared to generate a loss which can be used to retrain the skill classifier 430 to better predict skills in single-factor modelling scenarios, such as at prediction time when interacting with a client/customer.

Skill repository 426 comprises chatbot repository 432. Chatbot repository 432 is any repository or storage which contains data or instances of one or more chatbots that is implemented to process interactions. Chatbot repository 432 may contain a parent chatbot 434 that can interact generally with a user of the data processing system 400. Chatbot repository 432 may further comprise child chatbots 436A-436N corresponding to skills within the chatbot ecosystem.

Data processing system 400 may further comprise data store 438. Data store 438 is any storage, memory, or medium which can store data related to the operation of data processing system 400. For example, data store 438 may comprise model repository 446, which may store one or more transform models for the transformation of intent data into skill data. Data store 438 may further comprise rule 440. Rules 440 is any set of rules, steps, instructions, computer-readable code, or other logic that will implement the methods described herein. Data store 438 may further comprise training instructions 442. Training instructions 442 is any set of steps or instructions which will cause the training of transform model 422 or any other transform model used to transform intent data 420 into skill data 424. Data store 438 may further comprise skill bot information 444. Skill bot information 444 may comprise any data which corresponds to chatbots, skills or intents. For example, skill bot information 444 may comprise information relating to the child chatbot 436A-436N, skills corresponding to those chatbots, and/or intents associated with those skills and chatbots. Data store 438 is couple to any of the entities in data processing system 400 discussed thus far including those depicted in FIG. 4.

Example Multi-Factor Modelling Embodiments

Figure 5:
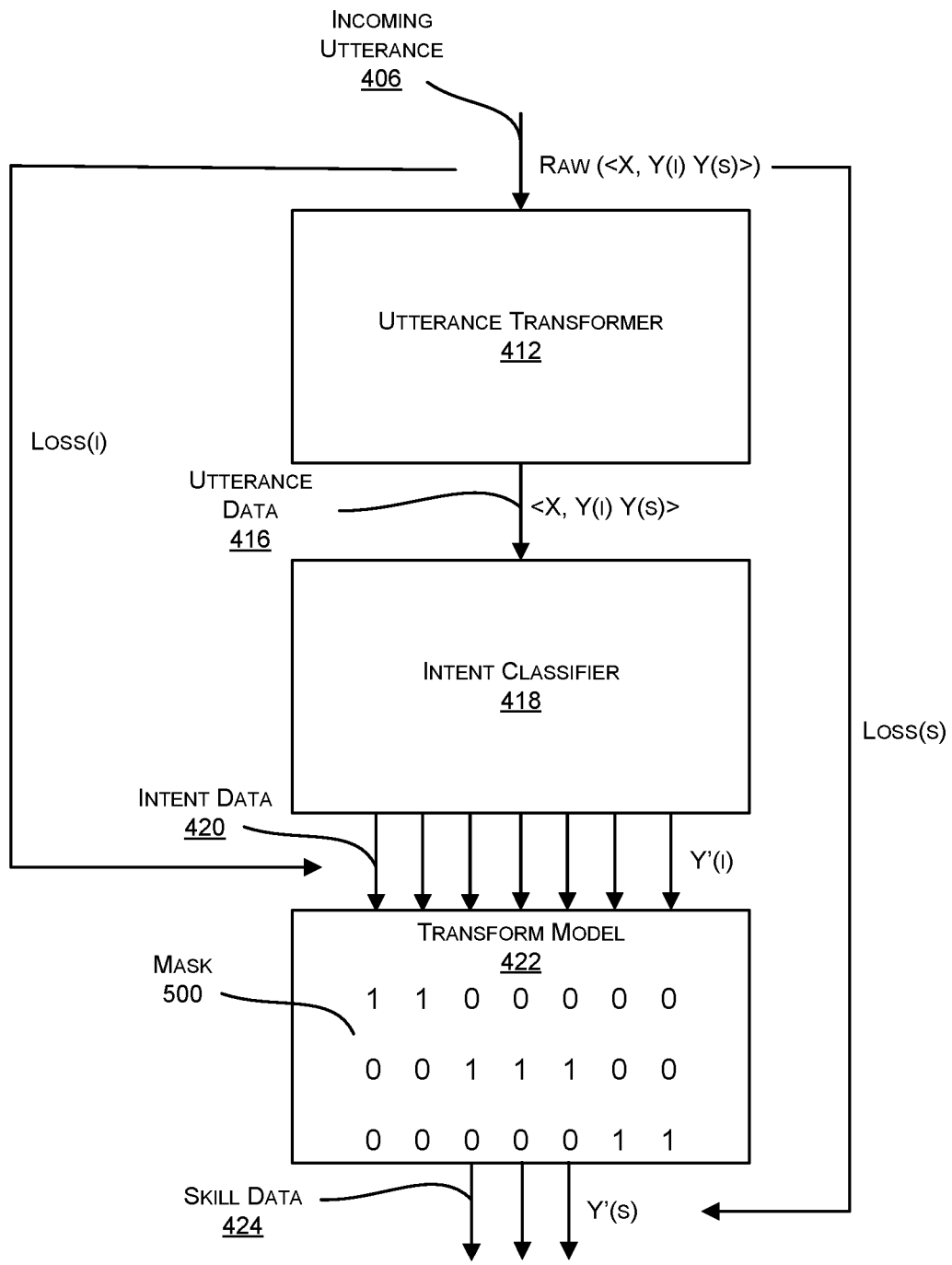
FIG. 5 is a simplified block diagram of a computing system implementing a transform model according to certain embodiments.

FIG. 5 is a simplified block diagram of a computing system implementing a transform model according to certain embodiments. Specifically, FIG. 5 illustrates the flow of an incoming interaction through a data processing system utilizing multi-factor modelling for natural language processing. In some embodiments the computing system depicted in FIG. 5 is utilized as part of a prediction process for determining a skill that will be used to respond to an utterance. For example, the computing system may receive an incoming utterance 406 from a client/customer and select a skill that will be used to process the incoming utterance 406 and/or generate a response to the incoming utterance 406. In other embodiments the computing system depicted in FIG. 5 is utilized as part of a training process for determining a skill to be compared to a ground-truth skill to refine the multi-factor model depicted. For example, the determined skill output by the computing system in FIG. 5 may be compared to a ground-truth skill included in some training data and the difference between the determined skill and the ground-truth skill may be used to retrain the components of the computing system. At the same time, the determined intent output by from intent classifier 418 may be compared to a ground-truth intent included in some training data and the difference between the determined intent the ground-truth intent may be used to retrain the components of the intent classifier 418.

As depicted in FIG. 5, the illustrated block diagram relates to a flow that is implemented by a computer device or system to generate skill data 424 from some raw incoming utterance 406. The skill data 424 that is generated includes information that may be used to select a skill, such as a set of skill scores based on the original incoming utterance 406. For example, the incoming utterance 406 may include a query related to ordering a pizza from a pizzeria chatbot and the skill data 424 includes a number of skill "scores" generated by the intent classifier 418 and transform model 422 as a result of a multi-factor modelling technique.

In embodiments involving a prediction process, the incoming utterance 406 includes data relating to an utterance generated by a client/customer entity which should be processed by an appropriate skill to respond to the client/customer. In this case, the goal of the multi-factor modelling process depicted in FIG. 5 is to utilize information included in the incoming utterance 406 to predict a skill for responding to a natural language-based query also included in the incoming utterance 406. The predicted skill may then responsively take some action based on the incoming utterance 406 and/or generate an outgoing natural language-based response for responding to the customer's/client's query.

In embodiments involving a training process, the incoming utterance 406 includes data relating to an utterance and a ground-truth skill that will be used to refine the multi-factor model depicted in FIG. 5. In this case, the goal of the multi-factor modelling process depicted in FIG. 5 is to attempt to predict a skill corresponding to the incoming utterance that would otherwise be used to process the incoming utterance 406 during prediction time. The predicted skill may be compared to the ground-truth skill (the skill that should be predicted if the multi-factor model was operating perfectly) to determine a delta between the predicted skill and the ground-truth skill. The delta may be used to refine the elements of the multi-factor model, such as the intent classifier 418 and or the transformation model 422. At the same time, the predicted intent from classifier 418 may be compared to the ground-truth intent to determine a delta between the predicted intent and the ground-truth intent. The delta may be used to refine the elements of the multi-factor model, such as the intent classifier 418.

In some embodiments, a highest score, or highest average score of a skill in the skill data 424 is utilized to select a predicted skill for processing the incoming utterance 406 during a prediction process or a training process. The incoming utterance 406 is first transformed in utterance transformer 412 to create utterance data 416 that is input to an intent classifier 418. For example, the natural language query related to ordering a pizza is broken down into new data including individual words, groupings of words, contextual details of words and the utterance as a whole, etc. The intent classifier 418 may utilize a model, such as an artificial neural network machine learning model, to transform the utterance data 416 into intent data 420 relating to one or more "scores" generated for each intent. For example, the one or more scores generated may related to probabilities that the incoming utterance 406 relates to a particular intent from a superset of intents related to one or more chatbot systems.

An example of an intent classifier 418 utilizing an artificial neural network is discussed further below, with reference to FIG. 7A.

The resulting intent data 420 is input to a transform model 422 including a mask 500, which is a transform model which will take, as input the intent data 420 to generate a set of transformed skill data 424 as output. In various embodiments, the mask 500 is a mapping dataset, such as a matrix, that represents a correspondence between dataset in the intent data 420 and a resulting skill. The mask 500 is thus applied to the intent data 420 to generate the skill data 424 which may be interpreted by skill selection instructions 428 to select a predicted skill based on the multi-factor modelling of the intent classifier 418 and transform model 422. In some embodiments, the mask 500 is a dynamically trained transformation value array that maps intent scores of intent data 420 to skill scores of skill data 424. Skill data 424 is utilized according to some instructions/criteria to select a skill for processing the incoming utterance 406. In some embodiments, the skill data 424 and/or selected skill is used to retrain various models, such as the utterance transformer 412, the intent classifier 418, the transform model 422, etc. (i.e. a training process). In other embodiments, the skill data 424 is used to select a skill that is used to parse and respond to the incoming utterance 406 in order to resolve a customer/client query (i.e. a prediction process).

In more specificity, as depicted in FIG. 5, an incoming utterance 406 is received from a user and input into the utterance transformer 412. The incoming utterance 406 is in a raw format and may have one or more variables or characteristics. For example, incoming utterance 406 may include a parameter X corresponding to one or more utterances received from a user (e.g., queries in a natural language-based format), a parameter Y(i) corresponding to a number of labels denoting ground-truth intents in a superset, and a parameter Y(s) corresponding to a number of labels denoting ground-truth skills in a superset. For example, the parameter X includes one or more natural language-based queries (e.g., "I would like to order a pizza), the parameter Y(i) includes a set of intents that will be considered by a model, such as an input classifier (e.g., a pizza ordering intent, an order editing intent, etc.) and the parameter Y(s) includes a set of skills, one of which will be predicted based on the multi-factor modelling techniques presented in FIG. 5 (e.g., Order skill, which may either order a pizza or edit a previous pizza order).

The incoming utterance data includes the elements X, Y(i), and Y(s) as parameters for generating a prediction of a skill as part of the training or prediction processes described herein. For example, the one or more natural language queries X are the natural language queries included in the incoming utterance 406, the intent superset Y(i) is the set of all intents that may be considered as part of the intent classifier 418, and the skill superset Y(s) is the set of all skills that may be predicted from the skill data 424 output by the multi-factor model. During a training process, X may be all the natural language queries for which the ground-truth skill is known. The parameters Y(i) and Y(s) may be predefined by the training process being executed and the predicted skill will be at least one of the superset of skills Y(s); the delta between the ground-truth intent the predicted intent data 420 may be used to update the parameters of the intent classifier 418; the delta between the ground-truth skill and the predicted skill data 424 (if different) may be used to update the parameters of the intent classifier 418 or transform model 422. During a prediction process, X may be all the natural language queries generated by the customer/ client, and Y(i) and Y(s) may be selected based on a source of the utterances (e.g., a customer/client interacting with a chatbot via an automated digital assistant implemented by a pizza restaurant may only use a specific set of intents and skills for interacting with customers).

The incoming utterance 406 is then processed by the utterance transformer 412 to transform the raw interaction data into utterance data 416 which is recognizable or more easily readable by the multi-factor model depicted in FIG. 5. For example, the one or more natural language queries X may be transformed to eliminate any data except simple ASCII character data that comprises the queries. In another example, the one or more natural language queries X may be transformed into a vectorized format in which each individual word of the query is a value in the input vector.

The utterance data 416 may then be sent to an intent classifier 418, which will utilize the utterance data 416 as input to generate intent data 420 as output. The intent data is denoted as Y'(i) corresponding to calculated scores for a set of intent labels. In various embodiments, the intent classifier 418 utilizes a machine learning model, such as an artificial neural network, to intake utterance data 416 and output intent data 420. In this case, Y'(i) may be a vector of values or scores relating to output nodes of the artificial neural network. In some embodiments, Y'(i) may be calculate as part of a formula using the features of the one or more natural language queries X. An equation for determining Y'(i) may be:

$$Y'(i)=2*\text{sigmoid}(SF*-1.0*\text{distance}(W,\text{transform}(X))$$

where Y'(i) is intent data 420 including a set of vectorized scores for each intent in Y(i), "sigmoid( )" is a sigmoid function which will return a calculated sigmoid of a feature parameter, SF is a scaling factor which is previously determined, for example by hyperparameter tuning or by a data scientist administrating the chatbot models, distance( ) is a function which calculates the relative mathematical distance between two values, W is a transformation matrix which is learned during model training denoting the centroid of each intent class, and transform(X) is a transformation of one or more natural language-based queries from the utterance data 416 into a format which can be compared to W.

The calculated intent data 420 including a vectorized dataset of values corresponding to each intent in Y(i) is thus represented by Y'(i). These values may be used in the determination of skill data 424 via a transform model as part of a multi-factor modelling process for determining a predicted skill for processing the incoming utterance 406. In embodiments implementing a prediction process, the output intent data 420 is then input into the transform model 422 to continue the prediction process.

In embodiments implementing a training process, the intent data 420 may also be input into the transform model to continue the skill prediction processes described herein. In additional, a supervised machine learning process may occur when intent classifier 418 is a machine learning model. For example, incoming utterance 406 may further include a ground-truth intent corresponding to a desired intent for the intent classifier to select given the input utterance data 416. Difference between one or more ground-truth intents Y(i) and intent data 420 denoted by Y'(i) is calculated and is referred to as the Loss(i), denoting the degree of error of the intent classifier in predicting the ground truth intent. The vectorized values in Y'(i) may be compared to one or more ground truth intents to determine if the vectorized values accurately represent a weighted importance of the ground-truth intents. For example, the loss of intent is calculated by the equation:

$$\text{Loss}(i)=w_0*\text{cross\_entropy\_loss}(\text{logit\_}y'(i),y(i))+ \\ w_1*\text{mse\_loss}(y'(i),y(i))+w_2*\text{margin\_loss}(y'(i))+ \\ w_3*\text{threshold\_loss}(y'(i),y(i))$$

where Loss(i) is a total calculated loss based on differences between the values in y'(i) and the ground-truth intents y(i), $w_0$, $w_1$, $w_2$, and $w_3$ are weight values which are previously determined, for example by hyperparameter tuning or by a data scientist administrating the chatbot models, cross_entropy_loss( ) is a function that returns a cross-entropy loss of the ground-truth labels y(i), and a logistical distribution of the intent data 418 denoted by logit_y'(i), mse_loss( ) is function that returns a mean squared error loss of the ground truth intents y(i) and the values in y'(i), margin_loss( ) is a function that returns a margin-based loss classification for the values in y'(i), and threshold_loss( ) is a function that returns a threshold based loss of the ground truth intents y(i) and the values in y'(i).

In some embodiments, the loss calculated during training of the intent classifier 418 may be used to retrain the intent classifier. For example, when intent classifier 418 is a machine-learning model, the loss value may be used to alter the parameters of operation for intent classifier 418 in proportion to the calculated loss. In cases where intent classifier 418 is an artificial neural network, the loss function may be used to change weighted parameters of nodes in the neural network to refine the model for more accurate intent data 420 generation during future processing. In some embodiments, the loss calculated for the intent classifier 418 is further utilized as part of a universal loss value as described below.

The intent data 420 that is output from the intent classifier 418 is input into a transform model 422 to generate skill data 424. The transform model may contain one or more masks 500, which is any data, function, process, or equation that will transform the intent data 420 to generate skill data 424. For example, as depicted in FIG. 5, mask 500 corresponds to a matrix of values mapping one or more intent labels from intent data 420 to one or more skill labels. For example, given a chatbot system recognizing 7 intents and 3 skills, a 7×3 mask matrix of values is generated to map the intents to the skills. The output of the transform model 422 utilizing the mask 500 is skill data 424. Skill data is denoted as Y'(s). For example, an equation for determining Y'(s) from Y'(i) is:

$$Y'(s)=*Y'*i)*M)$$

where Y'(i) is the input intent data 420 and M is the mask matrix. In some embodiments, the mask matrix may transformed into a format that is acceptable for mathematical operations with a vectorized format of Y'(i). For example, the mask may be inverted on one or more axes in order to be added to or multiplied by the vectorized format of Y'(i) in order to calculate a vector sum or product of Y'(s). In this manner, the mask matrix may be altered from a standard matrix format to map certain rows or columns of the matrix to rows or columns or Y'(i) in order to create a vectorized output Y'(s). The output Y'(s) will therefore be a vector of skill probabilities corresponding to the probability that the one or more natural language queries X corresponds to any skill of a set of skills.

A skill of corresponding to the vectorized format of Y'(s) may be chosen as the most likely skill for processing an utterance based on some instructions to be applied to the skill data 424, such as skill selection instructions 428. For example, a skill selection instruction may occur by selecting a corresponding score value in Y'(s) that is the maximum, minimum, highest sum, highest average, etc. score of each vectorized score. Because some skills are associated with more than one intent, the manner in which a skill is selected, or in which Y'(s) is generated, are numerous. In some embodiments, Y'(s) is a vectorized version of skill data 424 which contains only the highest relative intent values for each corresponding skill. The equation below illustrates this embodiment:

$$y'(i)=[y1,y2,y3,y4,y5,y6,y7]$$

$$M=[1\ 1\ 0\ 0\ 0\ 0\ 0]$$

$$[0\ 0\ 1\ 1\ 1\ 0\ 0]$$

$$[0\ 0\ 0\ 0\ 0\ 1\ 1]]$$

$$Y(s)\{s=0\}=\max(y'(i)*M[0])=\max([y1*1\ y2*1\ 0\ 0\ 0\ 0\ 0])=s1$$

$$Y(s)\{s=1\}=\max(y'(i)*M[1])=\max([0\ 0\ y3*1,y4*1, y5*1\ 0\ 0])=s2$$

$$Y(s)\{s=2\}=\max(y'(i)*M[2])=\max([0\ 0\ 0\ 0\ 0\ y6*1, y7*1])=s3$$

$$Y'(s)=[s1,s2,s3]$$

where Y'(s) is the vectorized skill data 424, M is the mask matrix, s1-s3 are three scores corresponding to possible skills in Y(s) that may be selected for processing an utterance, and y1-y7 are seven scores corresponding to intents in Y(i). As illustrated by the equation above, the vector of intent score Y'(i) is multiplied by the mask matrix M to form three rows of vectors, each corresponding to a skill s1-s3. Each vector row may include a number of values, each values representing the likelihood that an intent corresponds to the incoming utterance 406 as output by the intent classifier 418, due to the mask matrix M only containing values of 0 and 1. From these three vector rows, only the highest value is each vector may be chosen and placed in a final vector of values Y'(s) corresponding to the highest values for each skill from among the three row vectors.

As an example, among the three row vectors generated by matrix multiplication of Y'(i) and M, the highest values in each row may be y2, y4, and y6, each corresponding to one of the three skills s1-s3. The resulting vector Y'(s) will then be [y2, y4, y6]. Using the vector Y'(s), a "best" skill may then be predicted based on the values in Y'(s). The predicted skill is the skill that is predicted to be the best skill for processing and responding to the incoming utterance 406. One example of instructions for selecting the predicted skill may include selecting the largest value among the vector Y'(s). For example, an equation that will select the best predicted skill for responding to the incoming utterance 406 is given by:

$$Y(\text{best})=(\max(Y'(s)))$$

where Y(best) is the predicted skill that is selected based on a highest value chosen from among Y'(s). It will be appreciated that many different combinations of selections and rules may be applied to predicting the skill for responding to the incoming utterance. In some embodiments, Y'(s) is a vector including a value for each possible skill in Y(s) where the value is an average value of each associated intent value in Y'(i). The predicted skill will correspond to the highest average value for a skill in Y'(s). In some embodiments, Y'(s) is a vector including a value for each possible skill in Y(s) where the value is the sum total of each associated intent value in Y'(i). The predicted skill will correspond to the highest average value for a skill in Y'(s).

In some embodiments, a machine learning model, such as a skill classifier 430, may be utilized for selecting the skill vector Y'(s) given an input of skill data 424 instead of applying instructions for forming Y'(s). Examples of applying a machine learning model to form Y'(s) is described below with reference to FIG. 6A.

Similar to the training of the intent classifier 418 described above, during a training process, the difference between a ground-truth skills Y(s) and a predicted skill Y'(s) is referred to as the Loss(s) denoting the degree of error of the multi-factor modelling system in predicting a correct skills. The difference between the ground-truth skill Y(s) associated with the incoming utterance 406 and the predicted skill Y'(s) is referred to as the Loss(s), denoting the degree of error of the transform model in predicting the correct skills to utilize for an action. The loss of skills is calculated by the equation:

$$\text{Loss}(s)=w0\_s*\text{cross\_entropy\_loss}(\text{logit\_}y(i),y(s))+ w1\_s*\text{mse\_loss}(y'(s),y(s))+w2\_s*\text{margin\_loss}(y'(s))+w3\_s*\text{threshold\_loss}(y'(s),y(s))$$

where y(s) is the ground-truth skills and y'(s) is the predicted skill. The equation is similar to the equation for Loss(i) above, except that the different between the predicted skill and the ground truth skill is applied to determine the Loss(s). In various embodiments, the Loss(i) may be combined with the Loss(s) to form a total loss of skill prediction that accounts for losses in both the intent scoring and the skill prediction. Using the calculated Loss(i) and Loss(s), the total loss of the data processing system is calculated as:

$$\text{Loss}(\text{total})=\text{Loss}(s)+\text{lambda}*\text{Loss}(i)$$

where lambda is a scalar representing a regularization rate to apply to the calculated loss of intent. According to various embodiments, the data processing system may normalize the Loss(total) value into a training format and alter any aspect of the multi-factor model by inputting the value into a training model. For example, the Loss(total) calculated during the parsing of training text data is normalized and used to alter the transform model 422 and/or the mask 500 to better map the known intents to the known skills.

The losses calculated, whether Loss(I), Loss(s), Loss (total) or any combination of the losses, may be used for retraining elements of the multi-factor model depicted in FIG. 5. In some embodiments in which the intent classifier is a machine learning model including one or more parameters of operation for transforming utterance data 416 into intent data 420. For example, intent classifier can be an artificial neural network machine learning model including one or more nodes and nodal parameters for transforming an input such as utterance data 416 into an output such as intent data 420. This embodiment is depicted below with reference to FIG. 7A.

The parameters of a machine learning model utilized as part of intent classifier 418 may be altered in proportion to the calculated losses defined above. For example, the parameters of specific nodes of an artificial neural network may be reweighted in proportion to the losses calculated. Specifically, parameters corresponding to certain nodes associated with a ground-truth intent/skill may be increased in proportion to the losses and certain nodes associated with a predicted intent/skill may be decreased in proportion to the losses to refine the machine learning model.

In some embodiments, the values of a mask 500 may be altered based on the losses calculated. For example, a mask 500 may include values that are between 0 and 1 and those values may be altered based on the losses calculated. For example, values in the mask 500 that correspond to a predicted skill may be decreased in proportion to the loss or values in the mask 500 that correspond to a ground-truth skill may be increased in proportion to the loss.

Figure 6B:
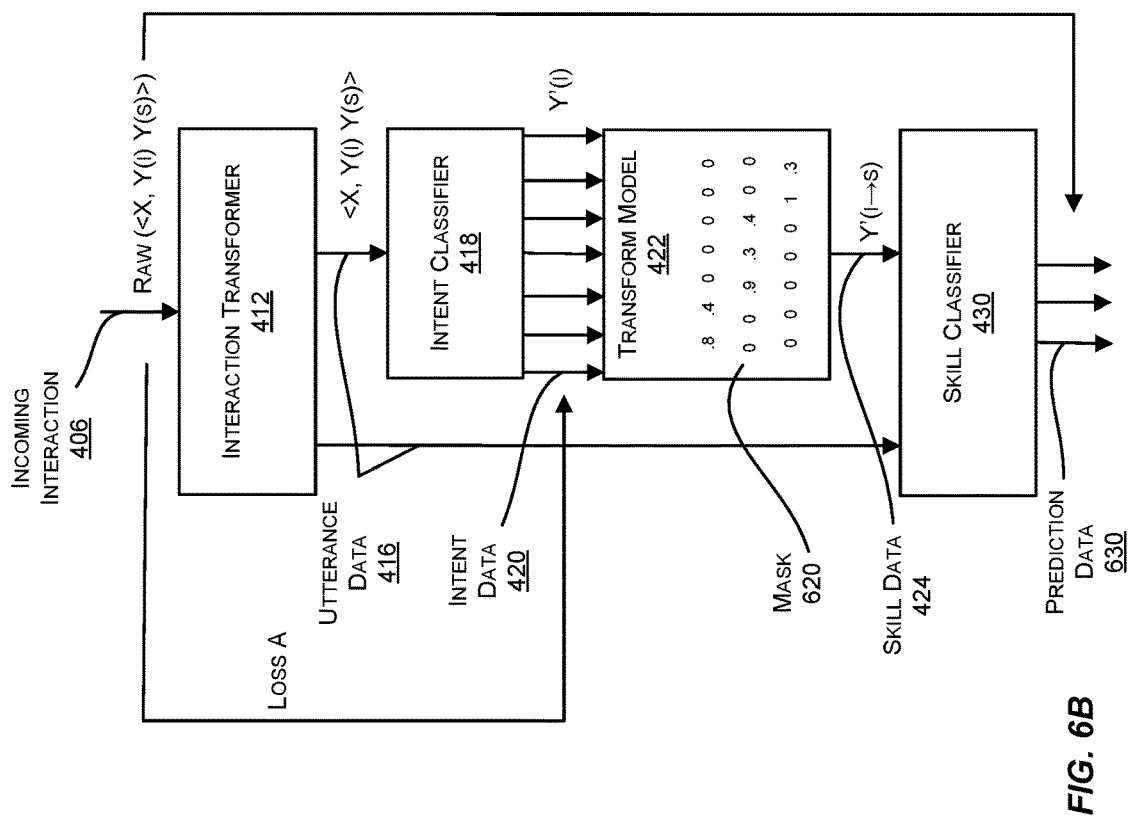
FIG. 6B is a simplified block diagram of a computing system implementing a transform model according to certain embodiments.
Figure 6A:
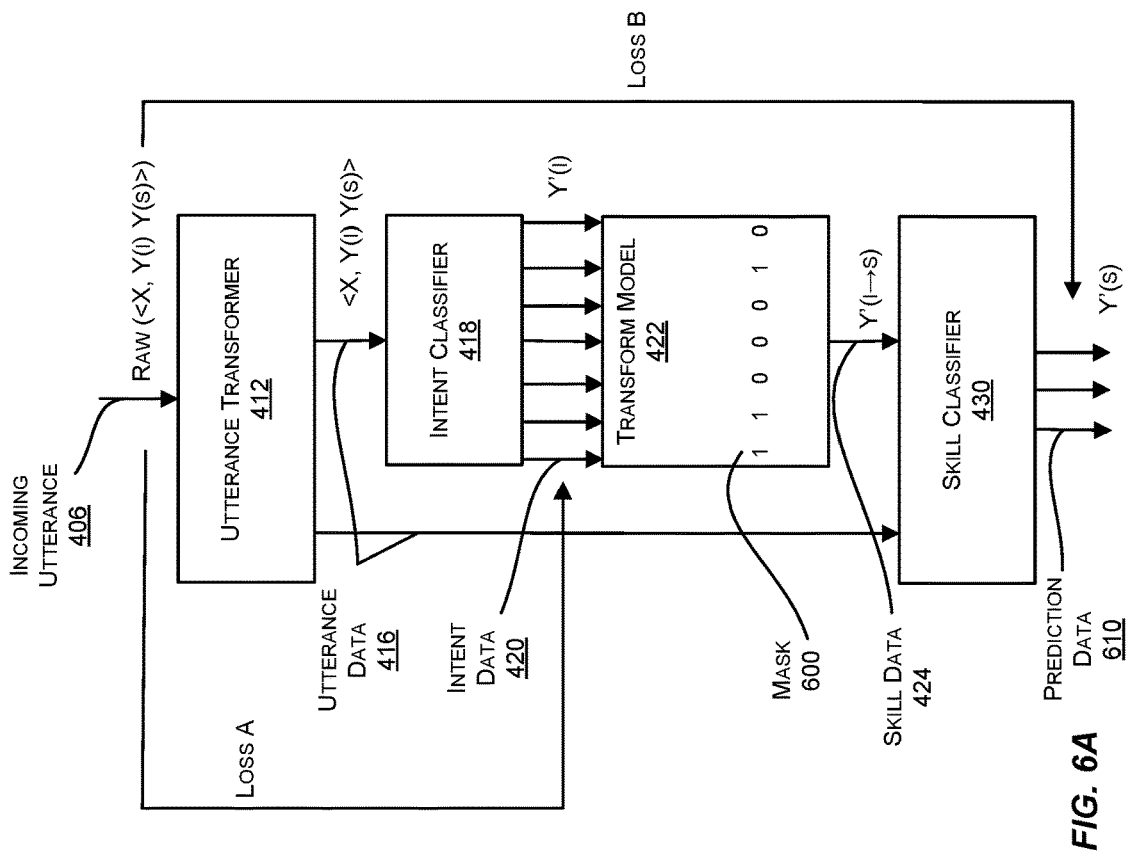
FIG. 6A is a simplified block diagram of a computing system implementing a transform model according to certain embodiments.

FIG. 6A is a simplified block diagram of a computing system implementing a transform model according to certain embodiments. Specifically, FIG. 6A shows an alternative arrangement of components of the data processing system depicted in FIG. 5 which includes a skill classifier 430 as part of the multi-factor modelling system. The skill classifier 430 may be implemented as both a single-factor model when receiving the utterance data 416 and as part of a multi-factor model when receiving the skill data 424 from the transform model 422.

As described above, single factor modelling is an efficient method for predicting a skill for responding to an incoming utterance, but does not predict skills with the same accuracy as a multi-factor model. As depicted in FIG. 6A, utterance data may be used in a single factor model, namely skill classifier 430, to generation prediction data 610 corresponding to a predicted skill for processing the incoming utterance 406. Because the prediction data 610 is generated by the skill classifier 430 using direct input of the utterance data 416, the skill may be predicted more quickly than the multi-factor modelling depicted in FIG. 5. However, the single-factor modelling performed by the skill classifier 430 is not as accurate as the contextual multi-factor modelling performed by the intent classifier 418 and transform model 422.

During a training phase, a single-factor modelling process and a multi-factor modelling process are executed to retrain skill classifier 430 to improve single-factor modelling processes. For example, incoming utterance data 406 may be subjected to multi-factor modelling as described with reference to FIG. 5. In some embodiments, as depicted in FIG. 6A, the mask 600 is a single vector mask instead of a matrix mask that will be applied to the intent data 420 to form skill data 424. For example, each element of vectorized intent data may be multiplied by a corresponding element in the vector mask 600 and the resulting product value will be inserted into vectorized skill data represented by Y'(I→S).

Once the vector of values Y'(I→S) is calculated, the vector is used to calculate a predicted skill as part of the multi-factor modelling process. In some embodiments, set of rules is applied to the vector Y'(I→S) to determine a predicted skill, similar to the embodiments discussed with reference to FIG. 5. In some embodiments, the vector Y'(I→S) is input to skill classifier 430 to output a predicted skill. For example, skill classifier 430 may include one or more skill predictions models, including one model for transforming input utterance data 416 into prediction data 610 (single-factor modelling) and another model for transforming a vector of skill values into prediction data 610 (as part of a multi-factor modelling process). Though the input utterance data 416 and skill data 424 are different types of input, the output of a predicted skill as part of prediction data 610 is the same and thus the outputs of a single-factor modelling process may be compared with the output of a multi-factor modelling process.

As described above, the skills predicted by single-factor modelling and multi-factor modelling of the same incoming utterance 406 may be used to refine the single-factor model to increase accuracy while retaining the speed of single-factor predictions. The predicted skills may be compared to determine a difference between the predicted skill for each separate process. The difference is used to identify a loss function or difference that is used to retrain the single-factor model, in this case the skill classifier 430. In various embodiments, a cost function may be used when multiple iterations of training are applied to the systems described with reference to FIGS. 5, 6A, and 6B. For example, multiple loss functions may be calculated for each iteration of training and used to determine a cost function. The loss functions/cost function may be used to retrain the model.

As described herein, the prediction data 610 that is generated by a single-factor modelling process will be more accurate due to the use of more contextually accurate intent data and a trainable transform model when compared to prediction data 610 derived that is generated through single-factor modelling when the utterance data 416 is input directly into the skill classifier. However, single-factor modelling is more time-efficient, in that a skill may be predicted without the various steps of multi-factor modelling. This it is useful to train a single-factor model such as skill classifier 430 using differences in output between multi-factor modelling and single-factor modelling to improve the single-factor modelling capabilities of a chatbot system.

As an example, the utterance "I ordered a pizza and it wasn't cooked so it was terrible" is received. Two skills are utilized for a chatbot: a pizza ordering skill and a customer service skill. A poorly trained single-factor model such as a skill classifier may select the skill for pizza ordered based simply on the terms "ordered" and "pizza" in the utterance, when customer serviced is the correct skill to process the utterance. A more granular contextual analysis using multi-factor modelling is more likely to select the correct skill. For example, the customer service skill may include an intent relating to unsatisfactory customer comments. The intent is highly correlated to the utterance due to the words "ordered" "pizza" as well as "wasn't cooked" and "was terrible." The intent may also determine a context unique to the utterance, such as the fact that the utterance is written in past tense and likely corresponds to customer service. In this example, the multi-factor modelling process provides a correct predicted skill versus the single-factor modelling process. The difference between skill predictions may be used to retrain the skill classifier—for example parameters in the skill classifier 430 weighing a correlation between the terms "order" and "pizza" and the pizza ordering skill may be decreased and parameters weighing a correlation between the terms "wasn't" and "terrible" and the customer service skill may be increased.

Thus, the resulting loss/difference between the predicted skills is used to retrain the skill classifier 430 to provide more contextually accurate prediction data 610 when the input utterance data 416 as part of a single-factor modelling process. Thus, the use of Thus, the block diagram depicted in FIG. 6A illustrates a hybrid contextual model that may efficiently train and utilize a skill classifier 430 during predictions phases. As described above, a prediction phase (or "deployment phase") is a phase in which a chatbot including the modelling techniques described herein in used to interact with an actual client/customer and resolve real natural language queries sent to the chatbot system as part of communication with an automated digital assistant utilized by a customer/client. During this phase, the model is effectively "deployed" to process and respond to the needs of customers/clients. Though the training phase may utilize predictions to retrain a model, the predictions used during the prediction phase will be used to response to real-world customers/clients. Client experiences are improved both when queries are resolved quickly and accurately. Thus, a contextually well-trained single-factor model, such as skill classifier 430, is a useful asset for a chatbot during the prediction phase. In some cases where a query posed by a customer/client is highly complex or a single-factor model is not sufficiently trained, the multi-factor model may be utilized to process the request and predict a skill for handling the queries to increase contextual accuracy at the expense of time-based efficiency. For example, a highly complex natural language query may be received and the utterance transformer may determine, during conversion to utterance data 416, that the language in the utterance may be too complex for the skill classifier to provide an accurate prediction. In response, the utterance transformer may send the utterance data 416 to the intent classifier 418 to begin a multi-factor modelling process.

FIG. 6B is a simplified block diagram of a computing system implementing a transform model according to certain embodiments. As depicted in FIG. 6B, the mask 620 is a more complex mask than mask 610 to provide a more contextually accurate set of skill data 424 before a skill is predicted from the skill data 424. As depicted in FIG. 6B, the mask may comprise values which are not Boolean, i.e. 0 and 1. For example, the mask 620 may comprise values which correspond to training-altered values such as doubles or floating point numbers which are frequently transformed according to training input according to the methods described herein. These values of the mask 620 may be more fine-tuned to affect a more accurate transformation of the intent data 420 to skill data 424. As described above, the mask 620 contains values which map intent scores in the intent data 420 to corresponding skills in the set of skills. In some cases, intents may not hold the same weight when determining a predicted skill as other intents. For example, a "promotional offer" intent may be used far less than a "pizza ordering" intent. As a result, the values in the mask 620 the represent a correspondence between the promotional offer intent and a skill may be far lower than the values that represent a correspondence between the pizza ordering intent and a skill.

Figure 7A:
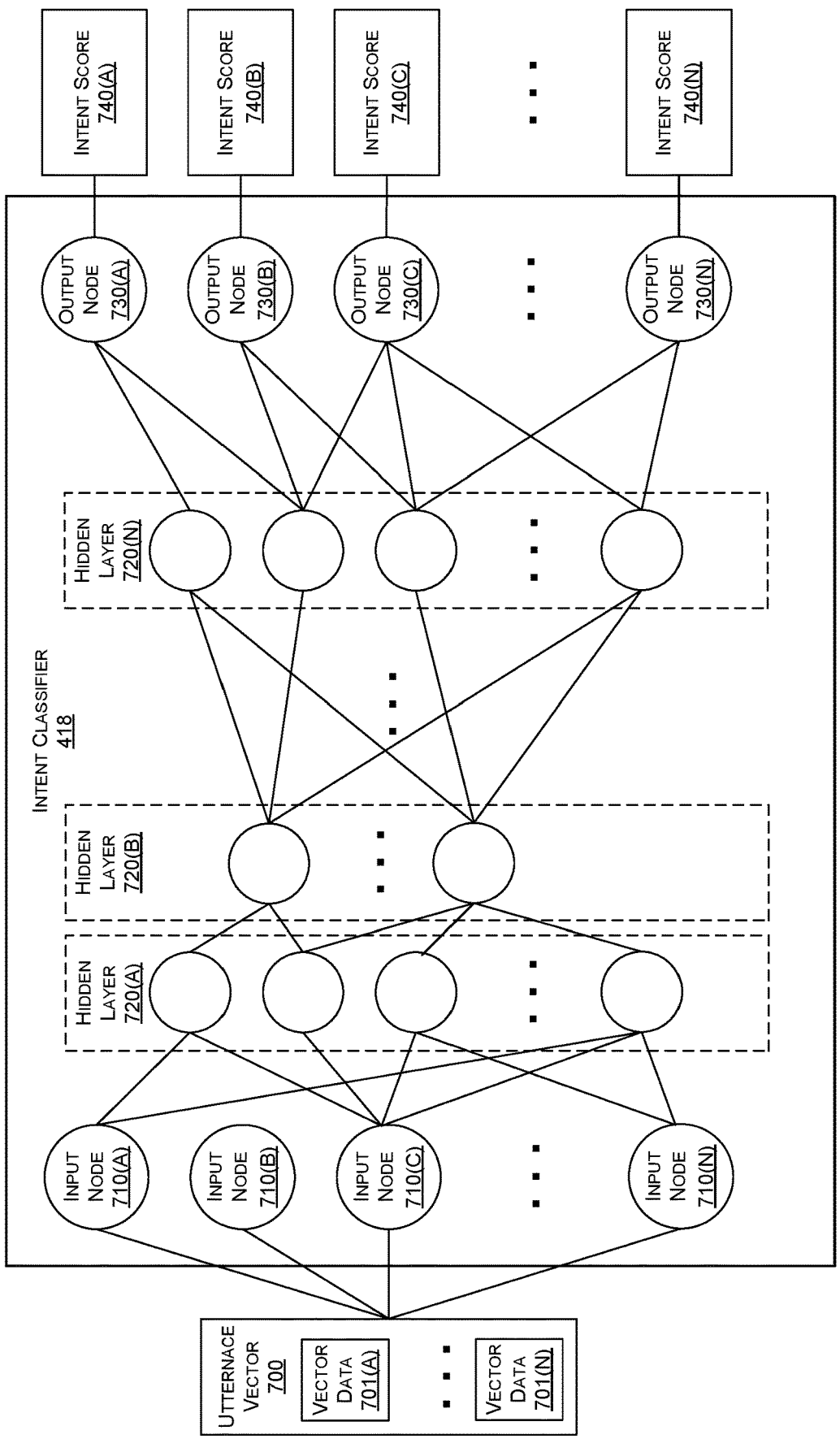
FIG. 7A is a simplified block diagram of an intent classifier configured as an artificial neural network according to certain embodiments.

FIG. 7A is a simplified block diagram of an intent classifier configured as an artificial neural network according to certain embodiments. Specifically, FIG. 7A depicts an example embodiment of intent classifier 418 configured to utilize an artificial neural network to take, as input, an utterance vector and output one or more intent scores. As described herein, the utterance vector 700 is a form of utterance data 416 derived from an utterance transformer 412 and the intent scores 740(A)-740(N) is a form of intent data 420 or contextual datasets output by the intent classifier 418.

As depicted in FIG. 7A, utterance vector 700 includes one or more sets of vector data 701(A)-701(N). Vector data may include any data which has been derived from an utterance/natural language-based query and which is in a format that is acceptable as input to the intent classifier 418. Vector data 701 may include, for example, individual words, groupings of words, contexts, fonts, punctuation, environments, customers, or any other data relating to an utterance as received from a customer/client. The utterance vector 700 in mapped to a set of input nodes 710(A)-710(N) in an artificial neural network of intent classifier 418. Each of these input nodes 710 is nodes including a nodal parameter/weight that determines a relative weight that each input in given in an initial stage of the artificial neural network.

The input nodes 710(A)-710(N) are mapped via one or more edges to an addition layer of the artificial neural network. For example, a number of edges emanating from the input nodes 710(A)-710(N) lead to additional nodes of a hidden layer, each of which may have a corresponding nodal parameter/weight value. For example, as depicted in FIG. 7A, input nodes 710(A)-710(N) are mapped to a hidden layer 720(A) of the artificial neural network. It will be appreciated that the artificial neural network is a network including a one-to-one edge relationship of nodes in each successive layer or any subset of edges therein.

The values passed from input nodes 710(A)-710(N) is successively passed through multiple hidden layers 720(A)-720(N) to progress through the neural network. It will be appreciated that the nodal parameters/weights and in some cases weights of edges between nodes is altered according to one or more machine learning training methods. Once hidden layer 720(N) has process the data from a previous hidden layer, the data is passed to one or more output nodes 730(A)-730(N). The output nodes 730(A)-730(N) may correspond to one or more final values of possible contextual sub-classes, such as intents of a chatbot, that are generated as a result of the artificial neural network. Thus, the artificial neural network of the intent classifier 418 may generate one or more probability scores relating to a probability that the input utterance vector 700 corresponds to a particular intent for processing and responding to an utterance. These probabilities is represented by intent scores 740(A)-740(N) that are derived from the output nodes 730(A)-730(N). The use of intent scores for selecting a skill is explored further below, with respect to FIG. 9.

Figure 7B:
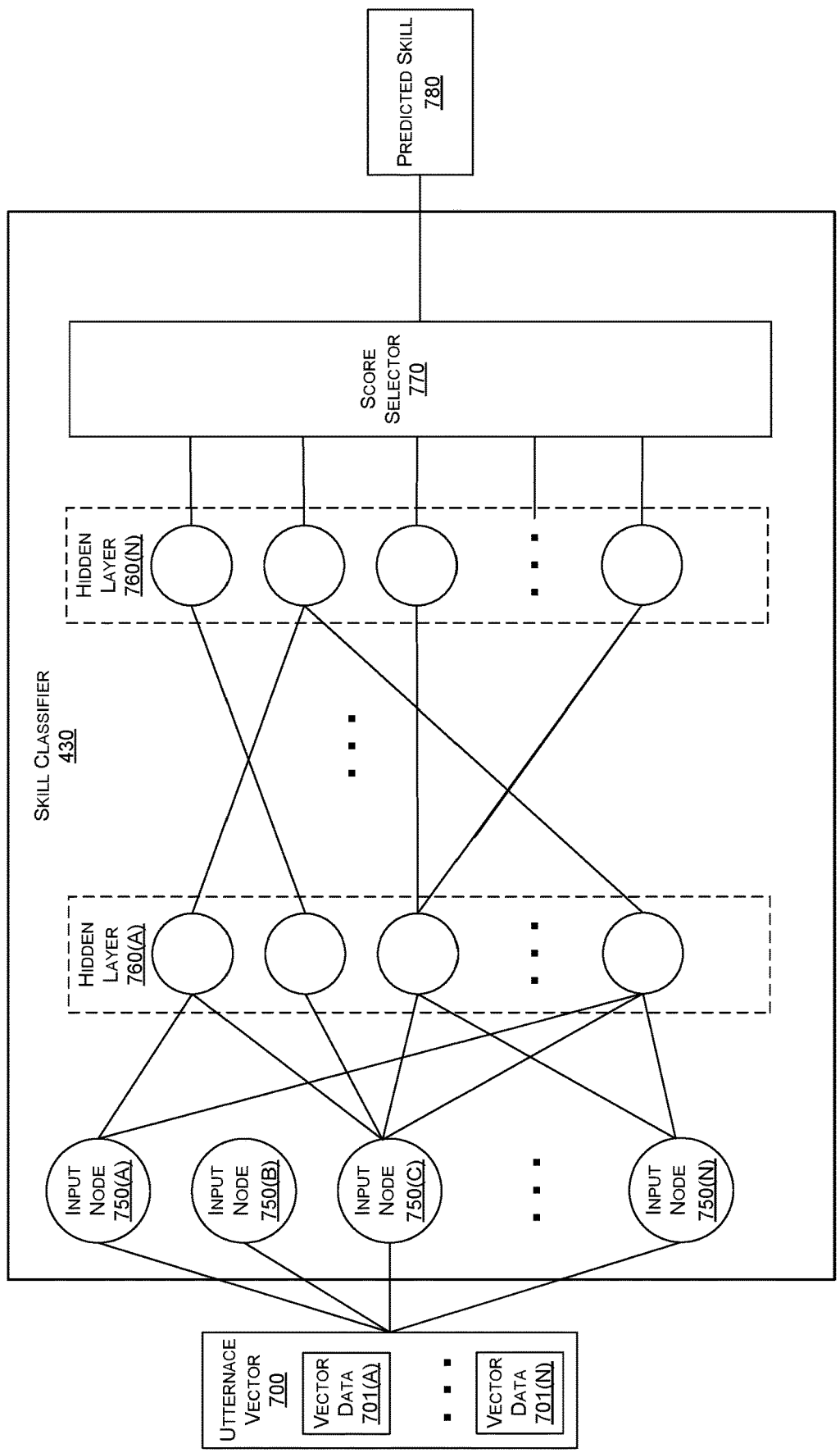
FIG. 7B is a simplified block diagram of a skill classifier configured as an artificial neural network according to certain embodiments.

FIG. 7B is a simplified block diagram of a skill classifier configured as an artificial neural network according to certain embodiments. Specifically, FIG. 7B depicts an example embodiment of skill classifier 430 configured to utilize an artificial neural network to take, as input, an utterance vector and output a predicted skill as part of single-factor modelling.

FIG. 7B is a simplified block diagram of an skill classifier 430 configured as an artificial neural network according to certain embodiments. Specifically, FIG. 7B depicts an example embodiment of skill classifier 430 configured to utilize an artificial neural network to take, as input, an utterance vector and output a predicted skill for processing an utterance. For example, the skill classifier 430 may intake an utterance vector 700 similar to the manner in which intent classifier 418 intakes an utterance vector. Skill classifier 430 may also include a number of input nodes 750(A)-750(N) and a number of hidden layers 760(A)-760(N) to progress through the neural network. It will be appreciated that the nodal parameters/weights and in some cases weights of edges between nodes is altered according to one or more machine learning training methods. The final hidden layer 760(N) may then send the values included therein to a score selector 770. The score selector 770 may utilize one or more score selection criteria and the values received from the hidden layer 760(N) to determine a predicted skill 780 that will be output by the skill classifier. For example, score selector 770 may receive one or more score values pertaining to a number of possible skills from which the predicted skill 780 may be selected and utilize a criteria specifying that the highest score is chosen for selecting the predicted skill 780.

Figure 8:
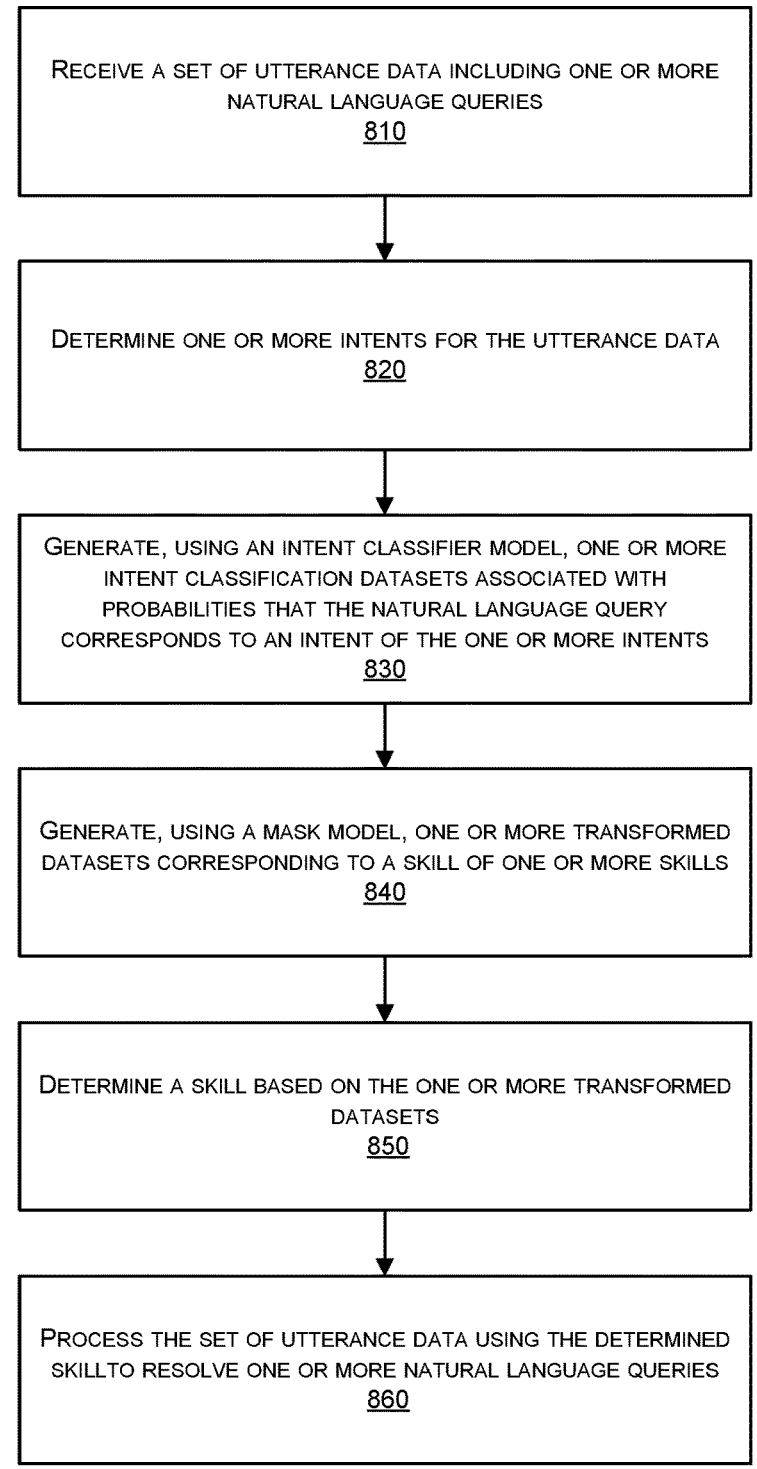
FIG. 8 illustrates a process flow for selecting a contextual class using transformative model for responding to an utterance in accordance with various embodiments.

FIG. 8 illustrates a process flow for determining a contextual class using a transformative model for responding to an utterance in accordance with various embodiments. The processing depicted in FIG. 8 is implemented in software (e.g., code, instructions, program) executed by one or more processing units (e.g., processors, cores) of the respective systems, hardware, or combinations thereof. The software is stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the steps is performed in some different order or some steps may also be performed in parallel. In various embodiments, the steps detailed in process 800 are performed by the systems and models discussed herein with respect to FIGS. 1-7B.

Process 800 begins at 810, when a set of utterance data is including one or more natural language queries is received. For example, the utterance data is received as part of incoming utterance 406 and is received at a communication portal 402 of data processing system 400. After receiving the incoming utterance 406, the data processing system processes the data to prepare the utterance for input into one or more contextual models for predicting a skill for processing and resolving the utterance. In some embodiments, the utterance data may indicate that the utterance is to be processed as part of a training phase for a chatbot model and/or a classifier model to refine the models for future prediction phases. In some embodiments, the utterance data may indicate that the utterance is from an automated digital assistant being utilized by a customer or client and should thus be used to provide a prediction of a skill corresponding to the utterance to respond to the customer/client query during a prediction phase. In various embodiments, the utterance is transformed, responsive to the receiving, by a data transformer, such as utterance transformer 412, to transform the data into an utterance vector, such as utterance vector 700, for input to a classifier, such as intent classifier 418.

At 820, one or more intents for the utterance data are determined. The one or more intents are possible intents that can be used to process and generate a response to the utterance, or which are associated with a predictable skill that will be used to process and generate a response to the utterance. In some embodiments, the received utterance is sent to a particular portion of data processing system 400 or have metadata associated therewith to determine a particular chatbot or area of interest that indicates a set of skills/intents for resolving the utterance. The metadata may be used to determine the intents for the utterance data. For example, the utterance may have been received from an automated digital assistant operating as part of a pizza delivery company website's portal, and thus indicating that a chatbot trained to handle pizza orders and related inquiries should be used to process the utterance. That chatbot is associated with a set of skills and intents and those intents will be determined when the chatbot is selected. In some embodiments, a superset of all possible intents known to a data processing system 400 is selected in step 820.

At 830, one or more intent classification datasets associated with probabilities that the utterance data corresponds to the one or more intents are generated using an intent classifier model. Specifically, the set of intents determined in 820 is used to select a particular machine learning model (such as the artificial neural network depicted in FIG. 7A) that corresponds to the intents determined. For example, the set of intents determined in 820 will all correspond to a pizza delivery utterance, and will also correspond to a chatbot which utilizes an intent classifier model as part of a multi-factor model for resolving pizza-delivery-based queries.

In embodiments implementing artificial neural networks, a particular intent classifier model includes nodes that will take, as input, vectorized utterance data derived from the utterance which will be mapped to a set of input nodes, such as input nodes 710(A)-710(N) to begin the process of generating one or more output intent classification datasets. The intent classification datasets output from the intent classifier is a set of "scores," such as intent scores 740(A)-740(N), that correspond to a set of probabilities that the utterance corresponds to a particular intent of the one or more intents determined in 820. This is similar to the input of utterance data 416 to the intent classifier 418 to output intent data 420 as depicted in FIG. 4. Thus, the output contextual datasets derived from the intent classifier model will indicate the likelihood that a particular intent corresponds most closely to the utterance to be resolved.

At 840, one or more transformed datasets are generated that correspond to one or more skills, using a mask model. Specifically the mask model is applied to the output intent classification datasets generated in 830 to generate one or more transformed datasets based on the data in the mask model. This is similar to the input of intent data 420 into the transform model 422 to output skill data as depicted in FIG. 4. The mask model may be, for example, a vector that is mathematically applicable to a vectorized version of the intent classification datasets. The mathematical application of such a mask matrix to the vectorized intent classification data will yield vectorized transformed datasets. The generated transformed datasets may correspond to a relative score or metric related to one or more skills classes that correspond to the intents determined in 820. For example, the one or more transformed datasets may include consolidated scores for each skill based on a transformation of the intent classification datasets that will be used to predict a skill for responding to an utterance using skill selection instructions, such as skill selection instructions 430. The mask to be applied may include map values for mapping contextual values corresponding to intents to associated transformed values corresponding to skills, such as mask 500.

At 850, a skill for processing the set of utterance data is determined based on the one or more transformed datasets. The determined skill will be used to process and respond to the utterance data received in 810. For example, the transformed datasets, which are similar to skill data 424, are processed according to a set of skill selection instructions 428 or by a skill classifier 430 to determine a predicted skill for processing the utterance data. In some embodiments, a selection criteria corresponding to a value comparison is performed according to skill selection instructions 428. In some embodiments, a machine learning model, such as model operating as part of skill classifier 430, may take, as input, the transformed datasets and output a set of skill scores that will be used to select a predicted skill for processing and responding to the utterance data. Examples of selection of a contextual skill class are given below with reference to FIG. 9.

At 860, the determined skill is used to process the set of utterance data to resolve the one or more natural language queries. For example, the determined skill in 850 is used to process and generate a response and/or perform a responsive action based on the processing of the utterance data in order to resolve the natural language queries.

In various embodiments, the process 800 is performed as part of a training phase of a chatbot model. For example, a loss function or value is calculated during a training phase according to the methods described herein. In various embodiments, a total loss is calculated based on the calculated loss of skill labels and loss of intent labels. In various further embodiments, the total loss is normalized and input into the transform model to alter the transform model. In various further embodiments the inquiry text data is processed and transformed by an altered transform model. In various embodiments, the determination of the skill class before the transform model is altered, and after it is altered, is further compared and/or used to further train the transform model.

In various embodiments, the process 800 is performed as part of a prediction phase of a chatbot model. For example, a skill classifier may not be appropriately trained using the methods described herein by the time the chatbot is made available to customers for prediction actions. In this case, the utterance data received at prediction time may first be processed by an intent classifier and a transformation mask is applied before a skill is selected to increase accurate prediction of a skill for responding to a natural language-based query. In some embodiments, if a contextual skill class is selected in for processing an utterance using direct input of utterance data and a relative value from the transformed dataset derived does not meet or exceed a confidence threshold, the utterance is reprocessed at prediction time using the process 800 including the intent classifier and mask transformation.

Figure 9:
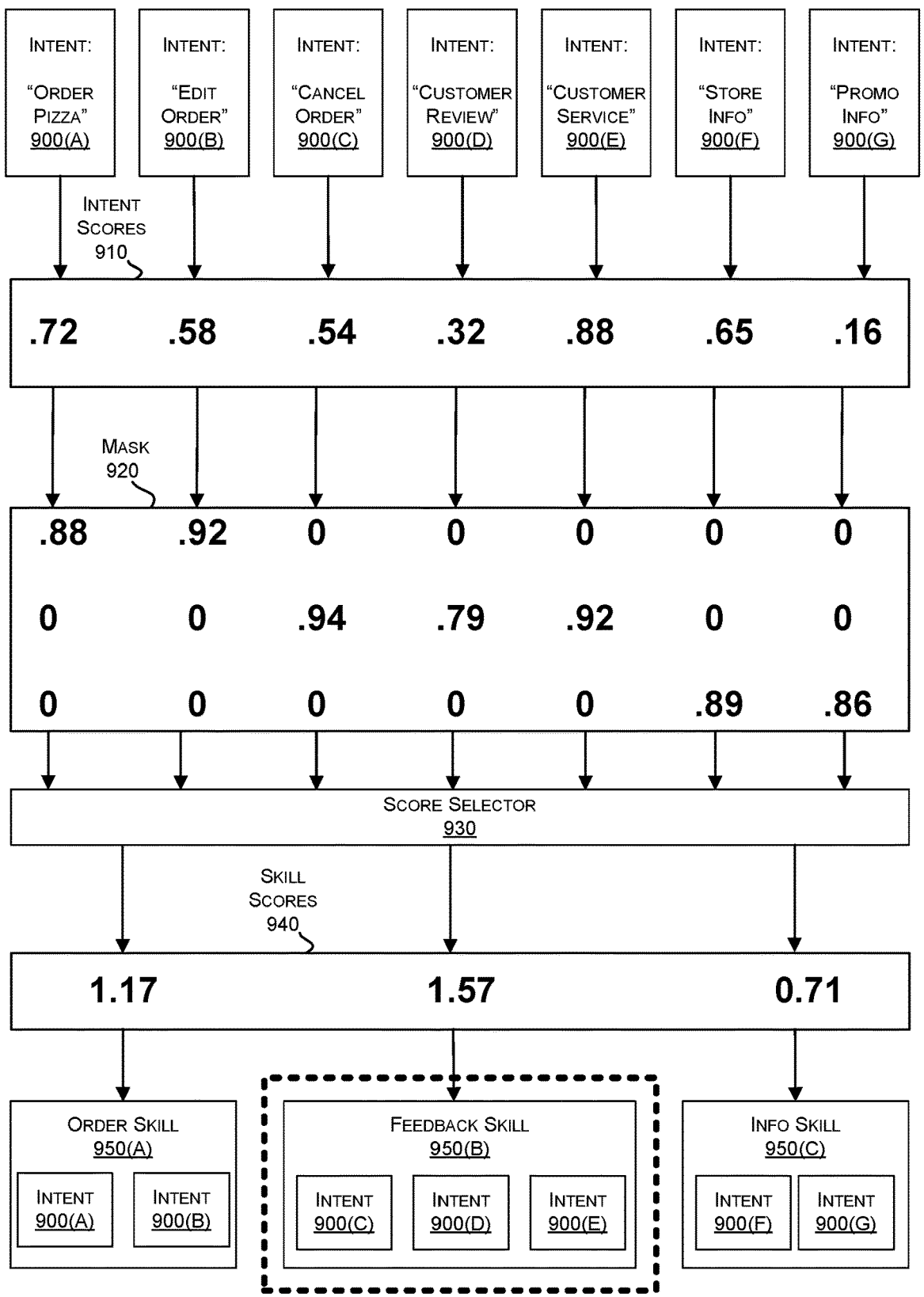
FIG. 9 is a simplified block diagram of an example selection of a skillbot according to intent classification techniques according to certain embodiments.

FIG. 9 is a simplified block diagram of an example selection of a skillbot according to intent classification techniques according to certain embodiments. Specifically, FIG. 9 depicts a flow for selecting a skill for processing a natural language-based query based on output scores of intent sub-classes, such as those generated according to the embodiments depicted in FIG. 7A and according to the process described in FIG. 8.

Intent 900(A)-900(G) may correspond to contextual datasets representing derived probabilities that an intent corresponds to an utterance, for example, the output intent scores 740(A)-740(N) depicted in FIG. 7A. Each intent corresponds to a different ability or processing context. For example, as depicted in FIG. 9, each intent 900(A)-900(G) corresponds to a different intent task, such as ordering a pizza, customer reviews of a pizzeria, etc. Each intent 900 corresponds to an intent scores as shown in a consolidated set of intent scores 910. The intent scores is part of a contextual dataset representing that probability that an utterance corresponds to an intent. For example, the utterance processed may have been "I ordered a pizza and it never showed up."

The intent scores 910 is transformed according to a mask 920 to generate a transformed dataset that will be used to select a skill for processing the utterance data. For example, the intent scores 920 are depicted in a matrix format and the mask is depicted in a matrix format that is multiplied by the intent scores 910 to generate corresponding skill scores. The manner in which the mask is applied and the manner in which a skill is correspondingly selected is determined by a score selector 930 subsystem, which is a part of skill selection instructions 428. For example, score selector 930 may include instructions that the intent scores 910 are to be multiplied by the mask 920 to generate skill scores 940 for each skill. The score selector 930 may further indicate that a highest skill score 940 in skill scores 940 is to be used to select a skill 950 for processing the utterance.

Skills 950(A)-950(C) is skills that is selected based on the skill scores 940 and according to some score selector 930 criteria. Each of skills 950 is associated with a subset of the intents 900(A)-900(G). As depicted in FIG. 9, the score among the skill scores 940 that is highest corresponds to the "Feedback Skill" 950(B). This skill contains the intent for "Customer Service" 900(E) and is the appropriate skill for processing and responding to the utterance "I ordered a pizza and it never showed up."

Illustrative Systems

Figure 10:
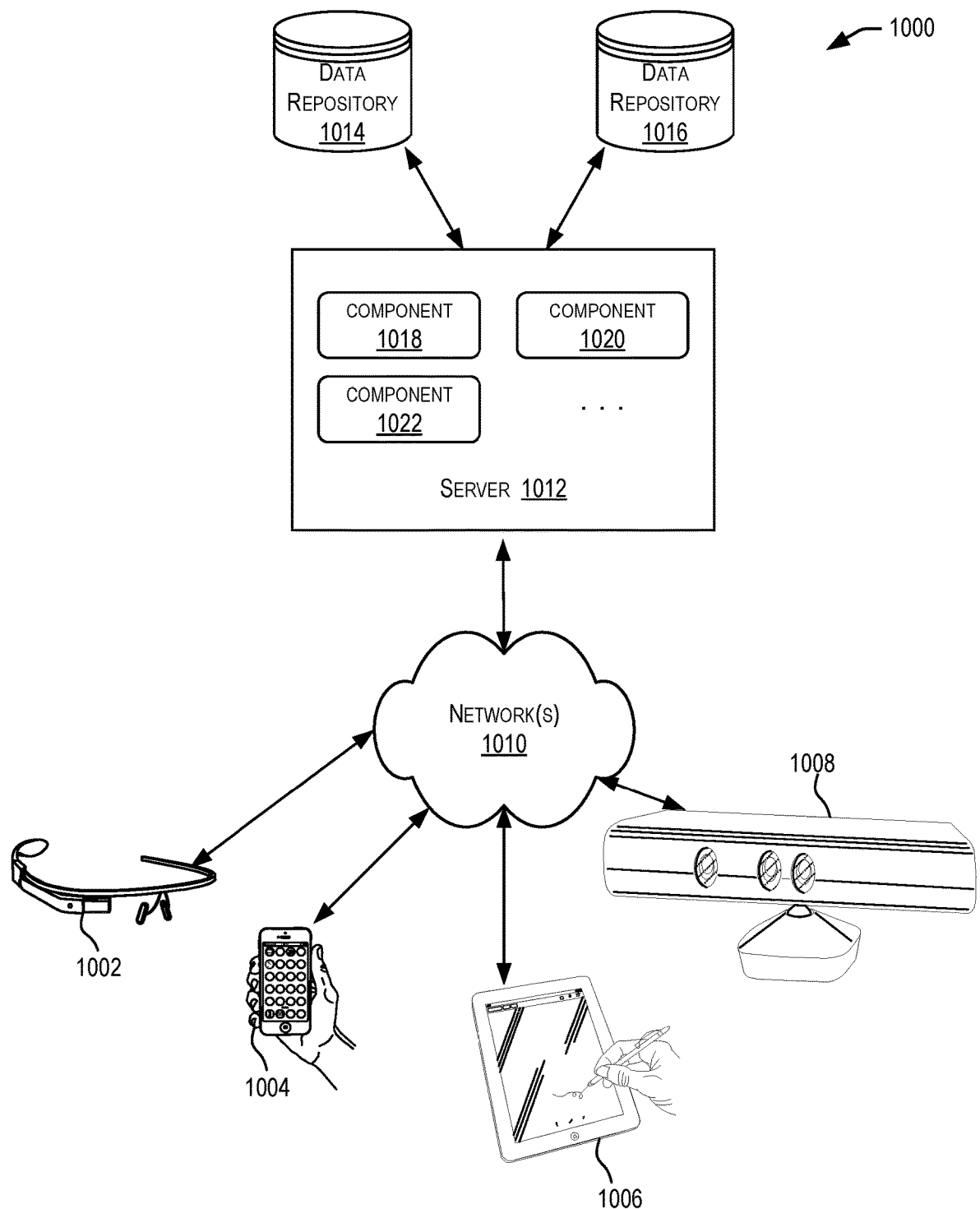
FIG. 10 depicts a simplified diagram of a distributed system for implementing various embodiments.

FIG. 10 depicts a simplified diagram of a distributed system 1000. In the illustrated example, distributed system 1000 includes one or more client computing devices 1002, 1004, 1006, and 1008, coupled to a server 1012 via one or more communication networks 1010. Clients computing devices 1002, 1004, 1006, and 1008 is configured to execute one or more applications.

In various examples, server 1012 is adapted to run one or more services or software applications that enable one or more embodiments described in this disclosure. In certain examples, server 1012 may also provide other services or software applications that may include non-virtual and virtual environments. In some examples, these services is offered as web-based or cloud services, such as under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, server 1012 may include one or more components 1018, 1020 and 1022 that implement the functions performed by server 1012. These components may include software components that is executed by one or more processors, hardware components, or combinations thereof. It should be appreciated that various different system configurations are possible, which is different from distributed system 1000. The example shown in FIG. 10 is thus one example of a distributed system for implementing an example system and is not intended to be limiting.

Users may use client computing devices 1002, 1004, 1006, and/or 1008 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 10 depicts only four client computing devices, any number of client computing devices is supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices is capable of executing various different applications such as various Internet-related apps, communication applications (e.g., E-mail applications, short message service (SMS) applications) and may use various communication protocols.

Network(s) 1010 is any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1010 is a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1012 is composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 may include one or more virtual machines running virtual operating systems, or other computing architectures involving virtualization such as one or more flexible pools of logical storage devices that is virtualized to maintain virtual storage devices for the server. In various examples, server 1012 is adapted to run one or more services or software applications that provide the functionality described in the foregoing disclosure.

The computing systems in server 1012 may run one or more operating systems including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories 1014, 1016. These data repositories is used to store data and other information in certain examples. For example, one or more of the data repositories 1014, 1016 is used to store information such as information related to chatbot performance or generated models for use by chatbots used by server 1012 when performing various functions in accordance with various embodiments. Data repositories 1014, 1016 may reside in a variety of locations. For example, a data repository used by server 1012 is local to server 1012 or is remote from server 1012 and in communication with server 1012 via a network-based or dedicated connection. Data repositories 1014, 1016 is of different types. In certain examples, a data repository used by server 1012 is a database, for example, a relational database, such as databases provided by Oracle Corporation® and other vendors. One or more of these databases is adapted to enable storage, update, and retrieval of data to and from the database in response to SQL-formatted commands.

In certain examples, one or more of data repositories 1014, 1016 may also be used by applications to store application data. The data repositories used by applications is of different types such as, for example, a key-value store repository, an object store repository, or a general storage repository supported by a file system.

Figure 11:
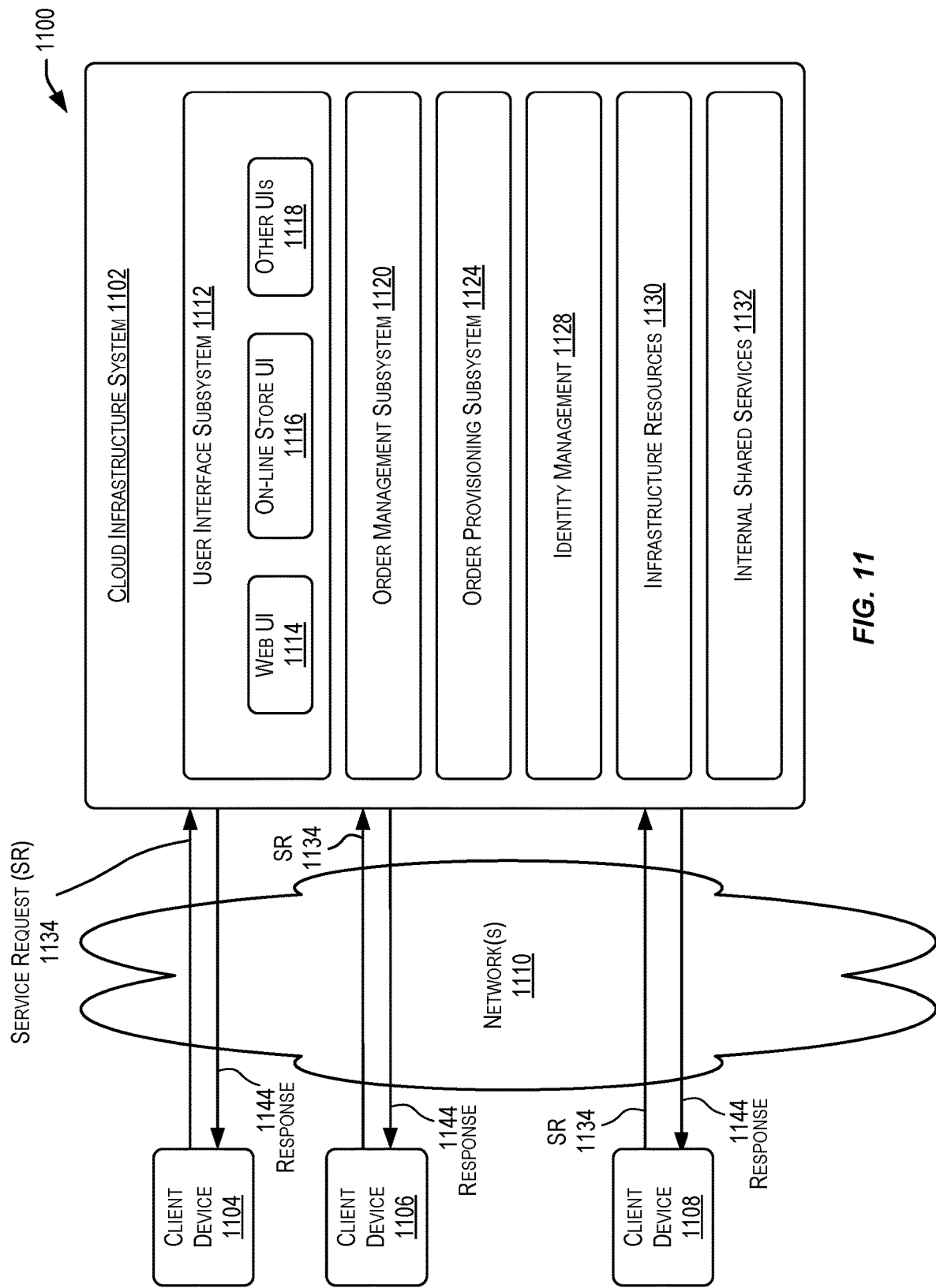
FIG. 11 is a simplified block diagram of one or more components of a system environment by which services provided by one or more components of an embodiment system is offered as cloud services, in accordance with various embodiments.

In certain examples, the functionalities described in this disclosure is offered as services via a cloud environment. FIG. 11 is a simplified block diagram of a cloud-based system environment in which various services is offered as cloud services in accordance with certain examples. In the example depicted in FIG. 11, cloud infrastructure system 1102 may provide one or more cloud services that is requested by users using one or more client computing devices 1104, 1106, and 1108. Cloud infrastructure system 1102 may comprise one or more computers and/or servers that may include those described above for server 612. The computers in cloud infrastructure system 1102 is organized as general purpose computers, specialized server computers, server farms, server clusters, or any other appropriate arrangement and/or combination.

Network(s) 1110 may facilitate communication and exchange of data between clients 1104, 1106, and 1108 and cloud infrastructure system 1102. Network(s) 1110 may include one or more networks. The networks is of the same or different types. Network(s) 1110 may support one or more communication protocols, including wired and/or wireless protocols, for facilitating the communications.

The example depicted in FIG. 11 is only one example of a cloud infrastructure system and is not intended to be limiting. It should be appreciated that, in some other examples, cloud infrastructure system 1102 may have more or fewer components than those depicted in FIG. 11, may combine two or more components, or may have a different configuration or arrangement of components. For example, although FIG. 11 depicts three client computing devices, any number of client computing devices is supported in alternative examples.

The term cloud service is generally used to refer to a service that is made available to users on demand and via a communication network such as the Internet by systems (e.g., cloud infrastructure system 1102) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model is used to provide customers access to on-demand applications that are hosted by cloud infrastructure system 1102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1102. Cloud infrastructure system 1102 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 1102 is configured to provide one or even multiple cloud services.

Cloud infrastructure system 1102 may provide the cloud services via different deployment models. In a public cloud model, cloud infrastructure system 1102 is owned by a third party cloud services provider and the cloud services are offered to any general public customer, where the customer is an individual or an enterprise. In certain other examples, under a private cloud model, cloud infrastructure system 1102 is operated within an organization (e.g., within an enterprise organization) and services provided to customers that are within the organization. For example, the customers is various departments of an enterprise such as the Human Resources department, the Payroll department, etc. or even individuals within the enterprise. In certain other examples, under a community cloud model, the cloud infrastructure system 1102 and the services provided is shared by several organizations in a related community. Various other models such as hybrids of the above mentioned models may also be used.

Client computing devices 1104, 1106, and 1108 is of different types (such as client computing devices 1002, 1004, 1006, and 1008 depicted in FIG. 10) and is capable of operating one or more client applications. A user may use a client device to interact with cloud infrastructure system 1102, such as to request a service provided by cloud infrastructure system 1102. For example, a user may use a client device to request information or action from a chatbot as described in this disclosure.

In some examples, the processing performed by cloud infrastructure system 1102 for providing services may involve model training and deployment. This analysis may involve using, analyzing, and manipulating data sets to train and deploy one or more models. This analysis is performed by one or more processors, possibly processing the data in parallel, performing simulations using the data, and the like. For example, big data analysis is performed by cloud infrastructure system 1102 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 11, cloud infrastructure system 1102 may include infrastructure resources 1130 that are utilized for facilitating the provision of various cloud services offered by cloud infrastructure system 1102. Infrastructure resources 1130 may include, for example, processing resources, storage or memory resources, networking resources, and the like. In certain examples, the storage virtual machines that are available for servicing storage requested from applications is part of cloud infrastructure system 1102. In other examples, the storage virtual machines is part of different systems.

In certain examples, to facilitate efficient provisioning of these resources for supporting the various cloud services provided by cloud infrastructure system 1102 for different customers, the resources is bundled into sets of resources or resource modules (also referred to as "pods"). Each resource module or pod may comprise a pre-integrated and optimized combination of resources of one or more types. In certain examples, different pods is pre-provisioned for different types of cloud services. For example, a first set of pods is provisioned for a database service, a second set of pods, which may include a different combination of resources than a pod in the first set of pods, is provisioned for Java service, and the like. For some services, the resources allocated for provisioning the services is shared between the services.

Cloud infrastructure system 1102 may itself internally use services 1132 that are shared by different components of cloud infrastructure system 1102 and which facilitate the provisioning of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1102 may comprise multiple subsystems. These subsystems is implemented in software, or hardware, or combinations thereof. As depicted in FIG. 11, the subsystems may include a user interface subsystem 1112 that enables users or customers of cloud infrastructure system 1102 to interact with cloud infrastructure system 1102. User interface subsystem 1112 may include various different interfaces such as a web interface 1114, an online store interface 1116 where cloud services provided by cloud infrastructure system 1102 are advertised and are purchasable by a consumer, and other interfaces 1118. For example, a customer may, using a client device, request (service request 1134) one or more services provided by cloud infrastructure system 1102 using one or more of interfaces 1114, 1116, and 1118. For example, a customer may access the online store, browse cloud services offered by cloud infrastructure system 1102, and place a subscription order for one or more services offered by cloud infrastructure system 1102 that the customer wishes to subscribe to. The service request may include information identifying the customer and one or more services that the customer desires to subscribe to. For example, a customer may place a subscription order for a service offered by cloud infrastructure system 1102. As part of the order, the customer may provide information identifying a chatbot system for which the service is to be provided and optionally one or more credentials for the chatbot system.

In certain examples, such as the example depicted in FIG. 11, cloud infrastructure system 1102 may comprise an order management subsystem (OMS) 1120 that is configured to process the new order. As part of this processing, OMS 1120 is configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1120 may then invoke the order provisioning subsystem (OPS) 1124 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1124 is configured to determine the particular cloud service being requested and identify a number of pods that may have been preconfigured for that particular cloud service. The number of pods that are allocated for an order may depend upon the size/amount/level/scope of the requested service. For example, the number of pods to be allocated is determined based upon the number of users to be supported by the service, the duration of time for which the service is being requested, and the like. The allocated pods may then be customized for the particular requesting customer for providing the requested service.

In certain examples, setup phase processing, as described above, is performed by cloud infrastructure system 1102 as part of the provisioning process. Cloud infrastructure system 1102 may generate an application ID and select a storage virtual machine for an application from among storage virtual machines provided by cloud infrastructure system 1102 itself or from storage virtual machines provided by other systems other than cloud infrastructure system 1102.

Cloud infrastructure system 1102 may send a response or notification 1144 to the requesting customer to indicate when the requested service is now ready for use. In some instances, information (e.g., a link) is sent to the customer that enables the customer to start using and availing the benefits of the requested services. In certain examples, for a customer requesting the service, the response may include a chatbot system ID generated by cloud infrastructure system 1102 and information identifying a chatbot system selected by cloud infrastructure system 1102 for the chatbot system corresponding to the chatbot system ID.

Cloud infrastructure system 1102 may provide services to multiple customers. For each customer, cloud infrastructure system 1102 is responsible for managing information related to one or more subscription orders received from the customer, maintaining customer data related to the orders, and providing the requested services to the customer. Cloud infrastructure system 1102 may also collect usage statistics regarding a customer's use of subscribed services. For example, statistics is collected for the amount of storage used, the amount of data transferred, the number of users, and the amount of system up time and system down time, and the like. This usage information is used to bill the customer. Billing is done, for example, on a monthly cycle.

Cloud infrastructure system 1102 may provide services to multiple customers in parallel. Cloud infrastructure system 1102 may store information for these customers, including possibly proprietary information. In certain examples, cloud infrastructure system 1102 comprises an identity management subsystem (IMS) 1128 that is configured to manage customer information and provide the separation of the managed information such that information related to one customer is not accessible by another customer. IMS 1128 is configured to provide various security-related services such as identity services, such as information access management, authentication and authorization services, services for managing customer identities and roles and related capabilities, and the like.

Figure 12:
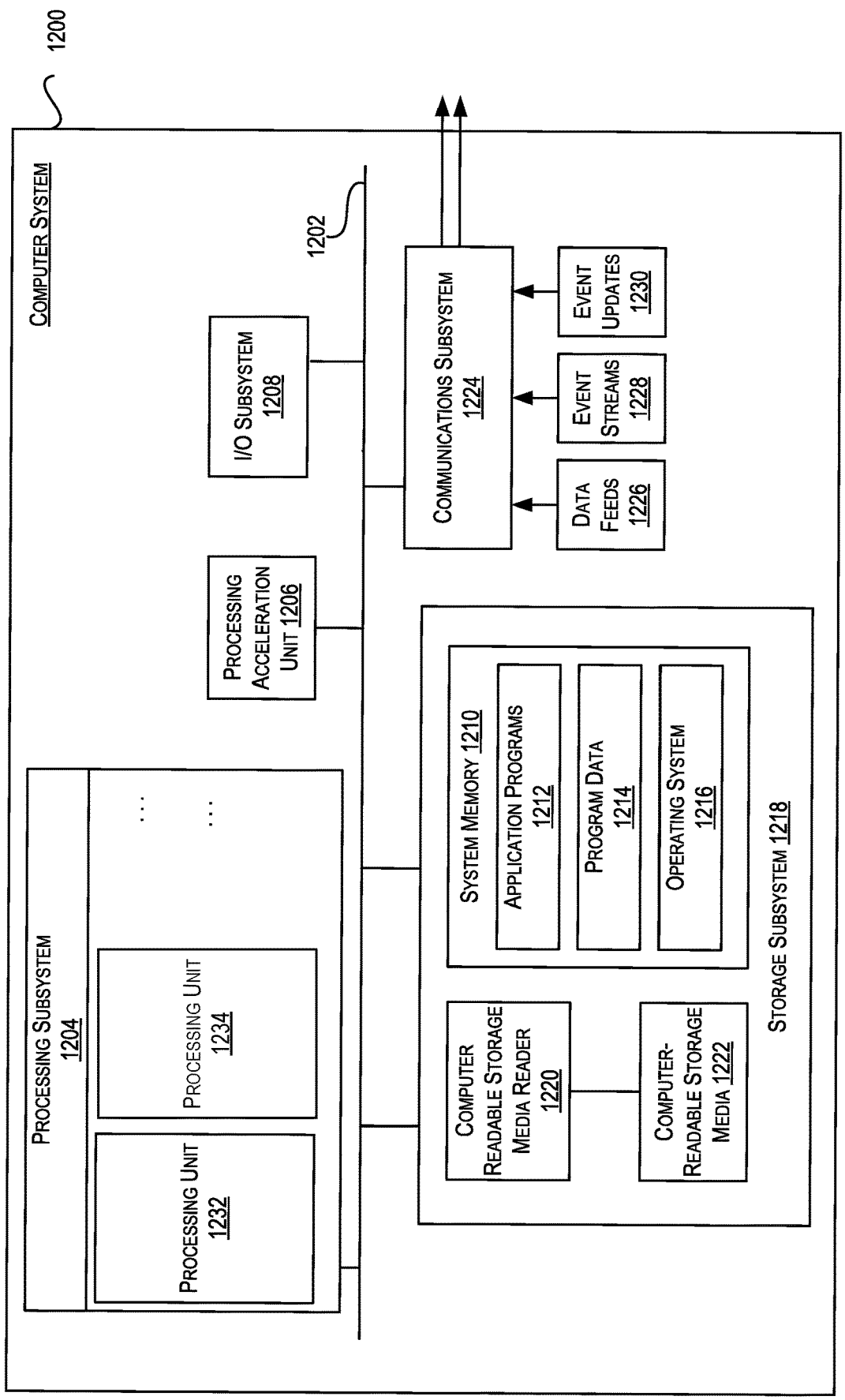
FIG. 12 illustrates an example computer system that is used to implement various embodiments.

FIG. 12 illustrates an example of computer system 1200. In some examples, computer system 1200 is used to implement any of the digital assistant or chatbot systems within a distributed environment, and various servers and computer systems described above. As shown in FIG. 12, computer system 1200 includes various subsystems including a processing subsystem 1204 that communicates with a number of other subsystems via a bus subsystem 1202. These other subsystems may include a processing acceleration unit 1206, an I/O subsystem 1208, a storage subsystem 1218, and a communications subsystem 1224. Storage subsystem 1218 may include non-transitory computer-readable storage media including storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative examples of the bus subsystem may utilize multiple buses. Bus subsystem 1202 is any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which is implemented as a Mezzanine bus manufactured to the IEEE P1386.1 standard, and the like.

Processing subsystem 1204 controls the operation of computer system 1200 and may comprise one or more processors, application specific integrated circuits (ASICs), or field programmable gate arrays (FPGAs). The processors may include be single core or multicore processors. The processing resources of computer system 1200 is organized into one or more processing units 1232, 1234, etc. A processing unit may include one or more processors, one or more cores from the same or different processors, a combination of cores and processors, or other combinations of cores and processors. In some examples, processing subsystem 1204 may include one or more special purpose co-processors such as graphics processors, digital signal processors (DSPs), or the like. In some examples, some or all of the processing units of processing subsystem 1204 is implemented using customized circuits, such as application specific integrated circuits (ASICs), or field programmable gate arrays (FPGAs).

In some examples, the processing units in processing subsystem 1204 may execute instructions stored in system memory 1210 or on computer readable storage media 1222. In various examples, the processing units may execute a variety of programs or code instructions and may maintain multiple concurrently executing programs or processes. At any given time, some or all of the program code to be executed is resident in system memory 1210 and/or on computer-readable storage media 1222 including potentially on one or more storage devices. Through suitable programming, processing subsystem 1204 may provide various functionalities described above. In instances where computer system 1200 is executing one or more virtual machines, one or more processing units is allocated to each virtual machine.

In certain examples, a processing acceleration unit 1206 may optionally be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer. User interface output devices may include a display subsystem, indicator lights, or non-visual displays such as audio output devices, etc. The display subsystem is a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information and data that is used by computer system 1200. Storage subsystem 1218 provides a tangible non-transitory computer-readable storage medium for storing the basic programming and data constructs that provide the functionality of some examples. Storage subsystem 1218 may store software (e.g., programs, code modules, instructions) that when executed by processing subsystem 1204 provides the functionality described above. The software is executed by one or more processing units of processing subsystem 1204. Storage subsystem 1218 may also provide authentication in accordance with the teachings of this disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM), dynamic random access memory (DRAM), and the like.

By way of example, and not limitation, as depicted in FIG. 12, system memory 1210 may load application programs 1212 that are being executed, which may include various applications such as Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1222 may store programming and data constructs that provide the functionality of some examples. Computer-readable media 1222 may provide storage of computer-readable instructions, data structures, program modules, and other data for computer system 1200. Software (programs, code modules, instructions) that, when executed by processing subsystem 1204 provides the functionality described above, is stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1218 may also include a computer-readable storage media reader 1220 that may further be connected to computer-readable storage media 1222. Reader 1220 may receive and be configured to read data from a memory device such as a disk, a flash drive, etc.

In certain examples, computer system 1200 may support virtualization technologies, including but not limited to virtualization of processing and memory resources. For example, computer system 1200 may provide support for executing one or more virtual machines. In certain examples, computer system 1200 may execute a program such as a hypervisor that facilitated the configuring and managing of the virtual machines. Each virtual machine is allocated memory, compute (e.g., processors, cores), I/O, and networking resources. Each virtual machine generally runs independently of the other virtual machines. A virtual machine typically runs its own operating system, which is the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices. For example, when computer system 1200 is used to implement bot system 120 depicted in FIG. 1, the communication subsystem is used to communicate with a chatbot system selected for an application.

Communication subsystem 1224 may support both wired and/or wireless communication protocols. In certain examples, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1224 may provide wired network connectivity (e.g., Ethernet) in addition to or instead of a wireless interface.

Communication subsystem 1224 may receive and transmit data in various forms. In some examples, in addition to other forms, communications subsystem 1224 may receive input communications in the form of structured and/or unstructured data feeds 1226, event streams 1228, event updates 1230, and the like. For example, communications subsystem 1224 is configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1224 is configured to receive data in the form of continuous data streams, which may include event streams 1228 of real-time events and/or event updates 1230, that is continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to communicate data from computer system 1200 to other computer systems or networks. The data is communicated in various different forms such as structured and/or unstructured data feeds 1226, event streams 1228, event updates 1230, and the like to one or more databases that is in communication with one or more streaming data source computers coupled to computer system 1200.

Computer system 1200 is one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations is performed in parallel or concurrently. In addition, the order of the operations is rearranged. A process may have additional steps not included in the figure. Various features and aspects of the above-described examples is used individually or jointly.

Further, while certain examples have been described using a particular combination of hardware and software, it should be recognized that other combinations of hardware and software are also possible. Certain examples is implemented only in hardware, or only in software, or using combinations thereof. The various processes described herein is implemented on the same processor or different processors in any combination.

Where devices, systems, components or modules are described as being configured to perform certain operations or functions, such configuration is accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples is practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes is made in the function and arrangement of elements.

The specification and drawings are, accordingly, to be regarded in an illustrative rather than a restrictive sense. It will, however, be evident that additions, subtractions, deletions, and other modifications and changes is made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure is used individually or jointly. Further, examples is utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods is performed in a different order than that described. It should also be appreciated that the methods described above is performed by hardware components or is embodied in sequences of machine-executable instructions, which is used to cause a machine, such as a general-purpose or special-purpose processor or logic circuits programmed with the instructions to perform the methods. These machine-executable instructions is stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods is performed by a combination of hardware and software.

Where components are described as being configured to perform certain operations, such configuration is accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts is otherwise variously embodied and employed, and that the appended claims are intended to be construed to include such variations, except as limited by the prior art.

What is claimed is:

1. A computer-implemented method, comprising:
receiving a set of utterance data corresponding to a natural language-based query that is interpretable by a chatbot;
determining a set of intents for the chatbot, wherein each intent of the set of intents corresponds to a possible intent for the natural language-based query and is associated with a skill of a plurality of skills for the chatbot;
generating, using an intent classifier model, intent classification datasets based on the intents included in the set of intents, wherein each intent classification dataset is associated with an intent score related to a probability that the natural language-based query corresponds to an intent of the set of intents;
generating, using a transformation mask model that uses mask data, transformed datasets by applying the mask data on the intent classification datasets, each of the transformed datasets corresponding to a skill of the plurality of skills, wherein the mask data is a matrix comprising transformation values respectively mapping the intent score associated with each intent classification dataset to a corresponding skill in the plurality of skills;
determining, using a skill classifier model, a first skill of the plurality of skills based on the transformed datasets; and
processing, based on the first skill, the set of utterance data to resolve the natural language-based query,
wherein the skill classifier model includes a machine learning model trained to, based on receiving, as an input, utterance data, output a predicted skill of the plurality of skills, and
wherein at least one of the transformation values in the matrix of the mask data is a non-Boolean number alterable during a retraining of the machine learning model.

2. The computer-implemented method of claim 1, wherein the set of utterance data is received from a client device interacting with an automated digital assistant.

3. The computer-implemented method of claim 1, wherein each of the transformation values corresponds to a ratio of least one intent and at least one skill.

4. The computer-implemented method of claim 3, wherein:
the set of utterance data comprises at least an indication of a ground-truth skill of the plurality of skills; and
the computer-implemented method further comprises:
comparing the ground-truth skill with the first skill to generate one or more training loss values; and
altering one or more transformation values based on the training loss values.

5. The computer-implemented method of claim 1, wherein:
the intent classifier model is a second machine learning model configured to receive, as input, the set of utterance data and output the intent classification datasets;
the set of utterance data comprises at least an indication of a ground-truth skill of the plurality of skills; and
the computer-implemented method further comprises:
comparing the ground-truth skill with the first skill to generate one or more training loss values; and
training the second machine learning model using the one or more training loss values to by altering a structure of the second machine learning model based on the training loss values.

6. The computer-implemented method of claim 1, further comprising:
generating, using the skill classifier model, a second skill;
comparing the first skill and the second skill to generate one or more training loss values, the one or more training loss values corresponding to one or more differences between the first skill and the second skill; and
retraining the machine learning model using the one or more training loss values to alter a structure of the machine learning model based on the training loss values.

7. The computer-implemented method of claim 1, further comprising:
processing, based on the determined first skill, the set of utterance data to generate a natural language-based response to the natural language-based query; and
sending, to a client device, the natural language-based response.

8. The computer-implemented method of claim 1, further comprising processing the set of utterance data to generate refined utterance data in a format for input to the intent classifier model, the refined utterance data is input into the intent classifier model to cause generating the intent classification datasets.

9. The method of claim 1, wherein:
each transformed dataset of the transformed datasets comprises a probability value corresponding to a likelihood that the set of utterance data corresponds to a skill of the plurality of skills; and
determining the first skill comprises selecting a skill corresponding to a transformed dataset having a highest probability value from among a set of one or more probability values.

10. The method of claim 1, wherein determining the first skill comprises generating one or more average probability values for each skill based on probability values associated with the intent classification datasets and selecting a skill associated with a highest average probability value from among the one or more average probability values.

11. A system comprising an integrated computing system that includes one or more processors and non-transitory machine readable storage medium having instructions stored thereon that, when executed by the one or more processors, cause the one or more processors to perform a method including:
receiving a set of utterance data corresponding to a natural language-based query that is interpretable by a chatbot;
determining a set of intents for the chatbot, wherein each intent of the set of intents corresponds to a possible intent for the natural language-based query and is associated with a skill of a plurality of skills for the chatbot;
generating, using an intent classifier model, intent classification datasets based on the intents included in the set of intents, wherein each intent classification dataset is associated with an intent score related to a probability that the natural language-based query corresponds to an intent of the set of intents;
generating, using a transformation mask model that uses mask data, transformed datasets by applying the mask data on the intent classification datasets, each of the transformed datasets corresponding to a skill of the plurality of skills, wherein the mask data is a matrix comprising transformation values respectively mapping the intent score associated with each intent classification dataset to a corresponding skill in the plurality of skills;
determining, using a skill classifier model, a first skill of the plurality of skills based on the transformed datasets; and
processing, based on the first skill, the set of utterance data to resolve the natural language-based query,
wherein the skill classifier model includes a machine learning model trained to, based on receiving, as an input, utterance data, output a predicted skill of the plurality of skills, and
wherein at least one of the transformation values in the matrix of the mask data is a non-Boolean number alterable during a retraining of the machine learning model.

12. The system of claim 11, wherein the set of utterance data is received from a client device interacting with an automated digital assistant in communication with the system.

13. The system of claim 11, wherein each of the transformation values corresponds to a ratio of least one intent and at least one skill.

14. The system of claim 13, wherein:
the set of utterance data comprises at least an indication of a ground-truth skill of the plurality of skills; and
the method further includes:
comparing the ground-truth skill with the first skill to generate one or more training loss values; and
altering one or more transformation values based on the training loss values.

15. The system of claim 11, wherein:
the intent classifier model is a second machine learning model configured to receive, as input, the set of utterance data and output the intent classification datasets;
the set of utterance data comprises at least an indication of a ground-truth skill of the plurality of skills; and
the method further includes:
comparing the ground-truth skill with the first skill to generate one or more training loss values; and
training the second machine learning model using the one or more training loss values to by altering a structure of the second machine learning model based on the training loss values.

16. The system of claim 11, wherein the method further includes:
  generating, using the skill classifier model, a second skill;
  comparing the first skill and the second skill to generate one or more training loss values, the one or more training loss values corresponding to one or more differences between the first skill and the second skill; and
  training, by the computing device, retraining the machine learning model using the one or more training loss values to by altering a structure of the machine learning model based on the training loss values.

17. A non-transitory machine readable storage medium having instructions stored thereon that, when executed by one or more processors, cause the one or more processors to perform a method including:
  receiving a set of utterance data corresponding to a natural language-based query that is interpretable by a chatbot;
  determining a set of intents for the chatbot, wherein each intent of the set of intents corresponds to a possible intent for the natural language-based query and is associated with a skill of a plurality of skills for the chatbot;
  generating, using an intent classifier model, intent classification datasets based on the intents included in the set of intents, wherein each intent classification dataset is associated with an intent score related to a probability that the natural language-based query corresponds to an intent of the set of intents;
  generating, using a transformation mask model that uses mask data, transformed datasets by applying the mask data on the intent classification datasets, each of the transformed datasets corresponding to a skill of the plurality of skills, wherein the mask data is a matrix comprising transformation values respectively mapping the intent score associated with each intent classification dataset to a corresponding skill in the plurality of skills;
  determining, using a skill classifier model, a first skill of the plurality of skills based on the transformed datasets; and
  processing, based on the first skill, the set of utterance data to resolve the natural language-based query,
  wherein the skill classifier model includes a machine learning model trained to, based on receiving, as an input, utterance data, output a predicted skill of the plurality of skills, and
  wherein at least one of the transformation values in the matrix of the mask data is a non-Boolean number alterable during a retraining of the machine learning model.

18. The non-transitory machine readable storage medium of claim 17, wherein the method further includes:
  processing, based on the determined first skill, the set of utterance data to generate a natural language-based response to the natural language-based query; and
  sending, to a client device, the natural language-based response.

19. The non-transitory machine readable storage medium of claim 17, wherein the method further includes:
  processing the set of utterance data to generate refined utterance data in a format for input to the intent classifier model, the refined utterance data is input into the intent classifier model to cause generating the intent classification datasets.

20. The non-transitory machine readable storage medium of claim 17, wherein:
  each transformed dataset of the transformed datasets comprises a probability value corresponding to a likelihood that the utterance data corresponds to a skill of the plurality of skills; and
  determining the first skill comprises selecting a skill corresponding to a transformed dataset having a highest probability value from among a set of one or more probability values.

* * * * *

UNITED STATES PATENT AND TRADEMARK OFFICE
CERTIFICATE OF CORRECTION

PATENT NO. : 12,099,816 B2
APPLICATION NO. : 17/578170
DATED : September 24, 2024
INVENTOR(S) : Jalaluddin et al.

Page 1 of 1

It is certified that error appears in the above-identified patent and that said Letters Patent is hereby corrected as shown below:

In the Drawings

On sheet 4 of 13, in FIG. 4, under reference numeral 412, Line 1, delete "UTTERNACE" and insert -- UTTERANCE --, therefor.

On sheet 4 of 13, in FIG. 4, under reference numeral 416, Line 1, delete "UTTERNACE" and insert -- UTTERANCE --, therefor.

On sheet 7 of 13, in FIG. 7A, under reference numeral 700, Line 1, delete "UTTERNACE" and insert -- UTTERANCE --, therefor.

On sheet 8 of 13, in FIG. 7B, under reference numeral 700, Line 1, delete "UTTERNACE" and insert -- UTTERANCE --, therefor.

In the Specification

In Column 19, Line 10, delete "used" and insert -- used. --, therefor.

In Column 25, Line 45, delete "and or" and insert -- and/or --, therefor.

In the Claims

In Column 52, Line 47, in Claim 13, delete "of least" and insert -- of at least --, therefor.

In Column 53, Line 11, in Claim 16, before "retraining" delete "training, by the computing device,".

Signed and Sealed this
Fourteenth Day of January, 2025

Derrick Brent
*Acting Director of the United States Patent and Trademark Office*